United States Patent
Scheeline et al.

(10) Patent No.: US 8,885,161 B2
(45) Date of Patent: Nov. 11, 2014

(54) ENERGY DISPERSION DEVICE

(75) Inventors: Alexander Scheeline, Champaign, IL (US); Thu Anh Bui, Hanoi (VN)

(73) Assignee: SpectroClick, Inc., Champaign, IL (US)

( * ) Notice: Subject to any disclaimer, the term of this patent is extended or adjusted under 35 U.S.C. 154(b) by 252 days.

(21) Appl. No.: 13/596,242

(22) Filed: Aug. 28, 2012

(65) Prior Publication Data

US 2013/0093936 A1 Apr. 18, 2013

Related U.S. Application Data

(60) Provisional application No. 61/546,216, filed on Oct. 12, 2011, provisional application No. 61/570,049, filed on Dec. 13, 2011.

(51) Int. Cl.
*G01J 3/28* (2006.01)
*G01J 3/44* (2006.01)
*G01J 3/10* (2006.01)
*G01K 13/00* (2006.01)
*G01J 3/18* (2006.01)
*G02B 27/44* (2006.01)
*G01J 3/42* (2006.01)

(52) U.S. Cl.
CPC .............. *G01J 3/1804* (2013.01); *G01J 3/4406* (2013.01); *G01J 3/10* (2013.01); *G01K 13/00* (2013.01); *G01J 3/28* (2013.01); *G02B 27/44* (2013.01); *G01J 3/42* (2013.01)
USPC ........................................................ 356/328

(58) Field of Classification Search
USPC ................................ 356/300–334
See application file for complete search history.

(56) References Cited

U.S. PATENT DOCUMENTS

| 7,092,101 | B2 | 8/2006 | Brady |
| 7,420,663 | B2 | 9/2008 | Wang |
| 7,505,130 | B2 | 3/2009 | Brady |
| 7,561,274 | B2 | 7/2009 | Brady |
| 7,773,218 | B2 | 8/2010 | Brady |
| 2007/0030484 | A1* | 2/2007 | Sobczynski ................... 356/328 |

OTHER PUBLICATIONS

J. Galban, CCD Detectors for molecular absorption spectrophotometry: A theoretical and experimental study on characteristics and performance, Analyst, 2010, 564-549, 135, United Kingdom.
M. A. Golab Spectral multiplexing method for digital snapshot spectral imaging, Appl. Opt. 2009, 1520-1526, 48. USA.
S. K. Nayar, High dynamic range imaging: Spatially varying pixel exposures, IEEE Computer Society Conf. 2000, 1472-1478, 1.
R.B. Bilhorn: Spectrochemical Measurement with Multichannel Integrating Detectors, Appl. Spectrosc., 1987, 1125-1136, 41(7), U.S.A.

(Continued)

*Primary Examiner* — Abdullahi Nur
(74) *Attorney, Agent, or Firm* — Singleton Law Firm, P.C.

(57) ABSTRACT

The invention provides an energy dispersion device, spectrograph and method that can be used to evaluate the composition of matter on site without the need for specialized training or expensive equipment. The energy dispersion device or spectrograph can be used with a digital camera or cell phone. A device of the invention includes a stack of single- or double-dispersion diffraction gratings that are rotated about their normal giving rise to a multiplicity of diffraction orders from which meaningful measurements and determinations can be made with respect to the qualitative or quantitative characteristics of matter.

43 Claims, 11 Drawing Sheets

(56) References Cited

OTHER PUBLICATIONS

C. Abrahamsson, Scatter Correction of Transmission Near-Infrared Spectra by Photon Migration Data. Quantitative Analysis of Solids, Appl Spectrosc., 2005, 1381-1387, 59(11), U.S.A.

(Jul. 31, 2012), http://gratings.newport.com/information/handbook/handbook.asp Table of Contents, U.S.A.

A. Aghanouri, Estimation of the Concentration of Dyes in Clear Solutions Using a Digital Camera, Analyt. Sci., 2010, 101-105, 26, Japan.

Alimelli, Direct alantitative Evaluation of Complex Substances Using Computer Screen Photo-assisted Technology: the Case of Red Wine, Anal. Chim. Acta, 2007, 103-112, 597(1), Netherlands.

J. F. Bell III, In-flight Calibration and Performance of the Mars Exploration Rover Panoramic Camera (Pancam) Instruments, J. Geophys. Res., 2006, E02S03 1-E02S03 38, 111, U.S.A.

R.B. Bilorn, Charge-transfer Device Detectors for Analytical Optical Spectroscopy—Operation and Characteristics, Appl. Spectrosc., 1987, 1114-1125, 41(7), U.S.A.

D. J. Brady. Compressive Sampling Strategies for Integrated Microspectrometers, Proc. SPIE, 2006, 62320C, 6232, U.S.A.

C. A. Bye, Two-Dimensional Array Detectors for Plasma Diagnostics, 1994, 315-367, The Application of Charge Transfer Devices in Chemistry, J.V. Sweedler, ed., VCH, New York. U. S. A.

E. Carrilho, Paper Microzone Plates, Anal. Chem., 2009, 5990-5998, 81(15), U.S.A.

F. S. Crawford, Jr., Berkeley Physics Series. Volume 3 (Waves), 1968, (Inside Back Cover), xv, 496, 520,523-524, and 526 McGraw Hill, New York. U. S. A.

E. C. Cull, Dispersion Multiplexing with Broadband Filtering for Miniature Spectrometers, Appl. Opt., 2007, 365-374, 46, U.S.A.

M.B. Denton, Charge-injection and Charge-coupled Devices in Practical Chemical Analysis, ACS Symposium Series, No. 236, Multichannel Image Detectors, vol. 2, Yair Talmi, Ed., I983, 133-154, U S.A.

A. K. Ellerbee, Quantifying Colorimetric Assays in Paper-based Microfluidic Devcies by Measuring the Transmission of Light through Paper, Anal. Chem., 2009, 8447-8452, 81(20), U.S.A.

S. D. Feller, Multiple Order Coded Aperture Spectrometer, Opt. Expr. 2007, 5625-5630, 15(9), U.S.A.

M. E. Gehm, Static Two-dimensional Aperture Coding for Multimodal, Multiplex Spectroscopy, Appl. Opt., 2006, 2965-2974, 45, U.S.A.

Jeffrey H. Giles, Selecting a CCD Camera, Anal. Chem, Oct. 1, 1998 663A-668A, U.S.A.

J. Guo, Single shot Subpixel Response Measurement with an Aperture Array Pixel Mask, Opt. Lett., 2006, 3441-3443, 31(23), U.S.A.

N. Hagen, Coded Aperture DUV Spectrometer for Standoff Raman Spectroscopy, Proc. SPIE, 2009, 73190D, 7319, U.S.A.

D. Harvey, Analytical Chemistry 2.0, Analytical Sciences Digital Library, 2010, Entry #10060, Chapter 10, U.S.A.

G. C. Holst, CMOS/CCD Sensors and Camera Systems, 2007, p. 110-188 (Chapter 5 and 6) and updated 2nd Ed. 2011, JCD Publishing, Winter Park, FL and SPIE Press, Bellingham, WA. U. S. A.

W.-H. Hsu, An Aberration-corrected Time- and Spatially-resolved Spectrometer for Studies of Transient Discharges, Spectrochim. Acta, 1989, 109-121, 44B, U.S.A.

J. D. Ingle, Spectrochemical Analysis, 1988, Prentice Hall, 64-78 and 128-132, U.S.A.

H. E. Ives, Note on the Location of the Spectrum Formed by a Plane Transmission Grating, J. Opt. Soc. Am. 1917, 172-176, 1, U.S.A.

K. D. Kelley, Cell Phone Spectrometer, J. Analyt. Sci. Digital Lib., 2009, entry 10059. U. S. A Reprinted in m-Science: Sensing, Computing, and Dissemination, 2010, 97-111, E. Cannesa ed., The Abdus Salam International Centre for Theoretical. Physics. Saudi Arabia.

D. S. Malkin, Submicrometer Plate Heights for Capillaries Packed with Silica Colloidal Crystals, Anal. Chem.,2010, 2175-2177, 82, U.S.A.

W. Martinez, Simple Telemedicine for Developing Regions: Camera Phones and Paper-based Microfluidic Devices for Real-time, Off-site Diagnosis, Anal. Chem., 2008, 3699-3707, 80(10), U.S.A.

(Jul. 31, 2012). Available: http://www.horiba.com/fileadmin/uploads/Scientific/Documents/Gratings/New_gratings_catalogue_2011.pdf France.

R. L McCreery, CCD Array Detectors for Multichannel Raman Spectroscopy, 1994, 227-279, The Application of Charge Transfer Devices in Chemistry, J.V. Sweedler, ed., VCH, New York. U. S. A.

D. L. Miller, A Computer Program for the Collection, Reduction, and Analysis of Echelle Spectra, Spectrochim. Acta, 1993, E1053-E1062, 48B, U.S.A.

B. J. Mork, Wavelength Resolved Single-Spark Emission Images Using a Charge Coupled Device Detector, Appl. Spectrosc. 1988, 1332-1335, 42, U.S.A.

B. J. Mork, Observations of High-Voltage Atmospheric-Pressure Spark Discharges in Argon Using a Charge-Coupled Device Detector, Spectrochim. Acta, 1989, 1297-1323, 44B, U.S.A.

T. A. Nieman, Development and Characterization of a Computer-controlled Vidicon Spectrometer, Anal. Chem., 1976, 619-624, 48, U.S.A.

A. D. Portnoy, Multichannel Sampling Schemes for Optical Imaging Systems, Appl. Opt, 2008; B76-B85, 47(10), U.S.A.

G. H. Riecke, Detection of Light: From the Ultraviolet to the Submillimeter, 2003, 145-186, Cambridge University Press, United Kingdom L. D. Rothman, Theoretical and Experimental Investigation of Factors Affecting Precision in Molecular Absorption Spectrophotometry, Anal. Chem. 1975, 1226-1233, 47, U.S.A.

D. A. Sadler, Automatic Wavelength Calibratiot Procedure for Use with an Optical Spectrometer and Array Detector, J. Anal. Atom. Spec. 1995, 253-257, 10, U.S.A.

G. Scarcelli, Cross-axis Cascading of Spectral Dispersion, Opt. Lett, 2008, 2979-2981, 32(24), U.S.A.

A. Scheeline, Echelle Spectrometer for Single Shot Elemental Analysis, Optical Spectroscopic Instrumentation for the 1990's, SPIE Symposium Series, 1990, 44-50, 1318, SPIE, Bellingham, WA. U. S. A.

A. Scheeline, Design and Characterization of an Echelle Spectrometer for Fundamental and Applied Emission Spectrochemical Analysis, Appl Spectrosc. 1991, 334-341, 45, U.S.A.

A. Scheeline, Focal Point: Teaching, Learning, and Using Spectroscop with Commercial, Off-the-Shelf Technology, Appl. Spectrosc., 2010, 256A-268A, 64(9), U.S.A.

D. A. Skoog, Principles of Instrumental Analysis, 6th Ed., 2007. Thomson Brooks-Cole. 175-200, 335-362 and 414-418. U. S. A.

J.-C Su, Chromaticity Stability of Phosphor-converted White Light-emitting Diodes with an Optical Filter, Appl. Opt., 2011, 177-182, 50, U.S.A.

Y. Talmi, Spectrophotometry and Spectrofluorometry with the Self-scanned Photodiode Array. Appl. Spectrosc., 1982, 1-18, 36, U.S.A.

A. P. Thorne, Spectrophysics, 2nd Ed., 988, 144-170, Chapman and Hall. United Kingdom.

A. A. Wagadarikar, Performance Comparison Codes for Multimodal, Multiplex Spectroscopy, Appl. Opt., 2007, 4932-4942, 46(22), U.S.A A. A. Wagadarikar, Single Disperser Design for Coded Aperture Snapshot Spectral Imaging, Appl. Opt., 2008, B44-B51, 47, U.S.A.

A. A. Wagadarikar, Video Rate Spectral Imaging Using a Coded Aperture Snapshot Spectral Imager, Opt. Expr. 17, 2009, 6368-6388, 8, U.S.A.

B. Wei, Plate Heights Below 50 nm for Protein Electrochromatography Using Silica Colloidal Crystals, Anal. Chem., 2010, 10216-10221, 82, U.S.A.

A. W. Martinez, Diagnostics for the Developing World: Microfluidic-based Analytical Devices, Anal. Chem., 2010, 3-10, 83, U.S.A.

R. M. Willett, Multiscale Reconstruction for Computational Spectral Imaging, Proc. SPIE, 2007, 6490L, 6498, U.S.A.

* cited by examiner

ENERGY DISPERSION DEVICE

CROSS-REFERENCE TO RELATED APPLICATIONS

The present application claims the benefit of U.S. Provisional Patent Application No. 61/546,216, filed Oct. 12, 2011, and U.S. Provisional Patent Application No. 61/570,049, filed Dec. 13, 2011, both of which are hereby incorporated by reference in their entireties.

BACKGROUND OF THE INVENTION

Many analytical instruments use the intensity of light of various colors over a range of wavelengths to study the composition of matter, both qualitative and quantitative. When light interacts with matter, it may undergo many processes including but not limited to absorption, scattering, reflection, refraction, fluorescence, and phosphorescence. Instruments are now available to measure the extent of these processes with good precision and accuracy throughout the ultraviolet, visible, near-infrared, infrared, and other regions of the electromagnetic spectrum. It is generally true that the closer a measurement is made to the information source most related to solving a problem, the less chance there is that delay, added noise, or contamination will confound accurate characterization of the system under study. Instruments that can provide a direct and immediate benefit to the general public, however, such as those for measuring water quality, the presence of contamination in food, presence of common infectious bacteria, soil composition, or the identity of questionable substances remain uncommon and used only by those with specialized training—due, in part, to cost and ease of use.

BRIEF SUMMARY OF THE INVENTION

The invention provides an energy dispersion device and method of use by which a member of the general public can evaluate the physical and chemical composition of matter on site without the need for specialize training or expensive equipment. The invention is based on the discovery of an arrangement of optical components based upon which an energy dispersion device or a spectrograph such as a spectrometer, spectrophotometer, or spectrofluorimeter can be constructed. The arrangement of optical components can be used to generate a spectrum having multiple spectral orders from which meaningful measurements and conclusions can be obtained. This arrangement allows for real time calibration and, thus, lessens the need for costly instrument components such as optical benches, lenses and mirrors that have matched coefficient of thermal expansion to maintain wavelength calibration that would be necessary to obtain useful data. In addition, the gaps between orders can be used to precisely measure stray light allowing for modeling and compensation. Changes in stray light levels may be interpreted to indicate levels of particulate matter suspended in solution (a measurement commonly known as nephalometry). The arrangement of optical components provided by the invention can compensate for the limited dynamic range of certain detectors, especially imaging detectors. The energy dispersion device of the invention can be used with a high pixel count electronic array detector of arbitrary dynamic range and arbitrarily large pixel count. The energy dispersion device can have a dynamic range that is greater than the dynamic range of the detector due to the unique arrangement of the optical components. The invention provides a more cost effective analytical instrument that is also easy to use and therefore amenable to widespread adoption.

In one embodiment, the invention provides an energy dispersion device that includes one or more double-dispersion diffraction gratings, or two or more single-dispersion diffraction gratings. Where two or more gratings are present, they are stacked (about-coplanar) and rotated about their normal. When illuminated with collimated light or other electromagnetic radiation (EMR), the dispersion device of the invention generates multiple diffraction orders dispersed with cylindrical symmetry about an observational center or origin and observable by an array detector through a lens or other focusing optic. So long as the transmission gratings are transparent over the wavelength range of interest, the light or other EMR may have any wavelength or set of wavelengths that the lens can transmit and the array detector can sense (light or EMR of other wavelengths, while present, simply goes undetected). The dispersion device also includes a limiting aperture or entrance aperture through which the light or other EMR can be admitted. The limiting aperture is placed at the focus of a collimating mirror (e.g. parabolic mirror such as off-axis paraboloidal mirror or replica parabola) or lens (e.g. compound, achromatic, apochromatic, or superapochromatic lens) such that light or other EMR admitted through the aperture can be collimated. Once collimated, the light or other EMR falls on the diffraction gratings, generating multiple diffraction orders. A lens or mirror can collect the diffracted light and focus it onto one or more array detectors. The dispersion device of the invention can be used with an EMR source, for example, one that generates light or other EMR in the spectrum from ultraviolet, visible to near infrared. The dispersion device of the invention can be used with fluorescent, phosphorescent, or auto-fluorescent materials. A dispersion device of the invention can be used with other optical components such as fiber optics, lenses, mirrors, or prisms, as these optical components can be used to transmit light or other EMR from the source to the aperture of a dispersion device of the invention.

In another embodiment, the invention provides an energy dispersion device comprising a limiting aperture for admitting electromagnetic radiation into the device, a collimating optic for collimating the electromagnetic radiation admitted through the limiting aperture, and a wavelength dispersion component for diffracting the collimated electromagnetic radiation into a multiplicity of diffraction orders. In the energy dispersion device, the limiting aperture is at the focus point of the collimating optic and the electromagnetic radiation admitted from the aperture is collimated by the collimation optic prior to being incident on the wavelength dispersion component. The wavelength dispersion component diffracts the electromagnetic radiation into a multiplicity of diffraction orders and may be a double-dispersion diffraction grating, or a stack of two of more single-dispersion diffraction gratings; a stack of two or more double-dispersion diffraction gratings; or a stack selected from single- and double-dispersion diffraction gratings; wherein the diffraction gratings in the stack are about coplanar and rotated about their normal such that each grating in the stack is rotated relative to the remaining gratings in the stack. In some embodiments, the energy dispersion device includes a stack of diffraction gratings in which the smallest angle of rotation for any grating in the stack relative to another grating in the stack is approximately equal for all gratings in the stack, the angle of rotation being an angle between about 15° and about 90°, inclusive. In some embodiments, the energy dispersion device includes a stack of diffraction gratings in which the smallest angle of rotation for any grating in the stack relative to another grating in the stack is about 15°, 22.5°, 30°, 45°, 60°, 75° or 90°. In some embodiments, the energy dispersion devices includes a stack of three single-dispersion diffraction gratings, each rotated about 60° relative to another grating in the stack. In some embodiments, the energy dispersion device includes a stack of four single-dispersion diffraction gratings, each rotated about 45° relative to another grating in the stack. In some embodiments, the energy dispersion device includes a stack of single-dispersion diffraction gratings, each rotated about 36° relative to another grating in the stack. In some embodiments, the energy dispersion device includes a stack of six single-dispersion diffraction gratings, each rotated about 30° relative to another grating in the stack. In some embodiments, the energy dispersion device includes a stack of one double-dispersion diffraction grating and four single-dispersion diffraction gratings, each single-dispersion diffraction grating rotated about +30° or −30° relative to another grating in the stack. In some embodiments, the energy dispersion device includes a stack of one double-dispersion diffraction grating and two single-dispersion diffraction gratings, one rotated about +45° and the other about −45° relative to the double-dispersion diffraction grating. In some embodiments, the energy dispersion device includes a stack of two double-dispersion diffraction gratings and two single-dispersion diffraction gratings, each grating rotated bout 30° relative to another grating in the stack. In some embodiments, the energy dispersion device includes a stack of two double-dispersion diffraction gratings rotated about 45° relative to each other. In some embodiments, the multiplicity of diffraction orders generated by the wavelength dispersion component is between 2 and 10, inclusive. In some embodiments, the multiplicity of diffraction orders is 2, 3, 4, 5, 6, or 8. In some embodiments, the diffraction gratings in an energy dispersion device of the invention have about the same separation and pitch and the electromagnetic radiation is dispersed with cylindrical symmetry about the observation center or origin.

In some embodiments, the energy dispersion device includes an electromagnetic radiation source. Some of the electromagnetic radiation emitted by the source is admitted to the rest of the device through the limiting aperture. In some embodiments, the electromagnetic radiation source is a light-emitting diode (LED). In some embodiments where an LED is used, the energy dispersion device can also include a sensor for determining the temperature at or near the LED pn junction. In some embodiments, the sensor can be a thermocouple or thermistor. In some embodiments, the electromagnetic radiation source emits or is capable of emitting fluorescent light. In some embodiments, the electromagnetic radiation source is autofluorescent. In some embodiments, the electromagnetic radiation source emits or is capable of emitting phosphorescent light.

In some embodiments, the collimating optic of the energy dispersion device is an off-axis parabolic mirror, replica parabola, an achromatic or superachromatic lens. In some embodiments, the energy dispersion device also includes a sample holder capable of receiving a fluid, test strip, or a solid sample. The fluid, test strip, or solid sample, if in the sample holder, is interposed in the collimated light between the collimating optic and the diffraction gratings.

In another embodiment, the invention provides a single-beam spectrophotometer that includes an energy dispersion device of the invention. In another embodiment, the invention provides a fluorimeter or phosphorimeter that includes an energy dispersion device of the invention.

In another embodiment, the invention provides a spectrograph that includes an energy dispersion device of the invention, as well as one or more focusing lenses or mirrors and one or more rectangular array detectors. In some embodiments, the one or more focusing lenses or mirrors and one or more rectangular array detectors have fields of view effective to observe at least two or at least three diffraction orders simultaneously. In some embodiments, the one or more detectors are complementary metal-oxide-semiconductor devices, charge-coupled devices, or charge injection devices. In some embodiments, the spectrograph further includes a data processor for constituting a spectrum of an image observed based on signals recorded by the detector. It will be appreciated by one of ordinary skill in the art that these signals are not human-readable. Furthermore, one of ordinary skill in the art will understand that, in order to output information suitable for human interpretation, the data processor may be, for example, an electronic or cybernetic processor that receives digitized input. Suitable processors include, but are not limited to, processors in desktop computers and laptop computers, programmable gate arrays, dedicated microcontrollers and microprocessors, embedded processors in tablets and cell phones, cloud computing, supercomputers, mainframe computers, and client-servers. In some embodiments, the data processor can generate a spectrum of an image observed based on signals from at least two or at least three diffraction orders. In some embodiments, the data processor is adapted to utilize signals from at least two or at least three diffraction orders to generate spectral intensities. In some embodiments, the data processor is adapted to utilize signals from various exposure times to determine resolution or wavelength dispersion. In some embodiments, the data processor is adapted to utilize signals from the detector to generate a time sequence of images. In some embodiments, the spectrograph includes a light-emitting diode (LED). In some embodiments where an LED is used, the spectrograph can also include a sensor for determining the temperature at or near the LED pn junction. In some embodiments, the sensor can be a thermocouple or thermistor. In some embodiments, the spectrograph includes a data processor for utilizing the temperature at or near the LED pn junction to determine a calibration wavelength.

An array detector may have digitizers built-in for digitizing recorded signals. An array detector may also send recorded analog signals to a digitizer in communication with a data processor. An array detector may include a data processor for signal processing, or may stream data to a digitizer using a data protocol. Some digitized data may be processed in the same enclosure as the array detector; other arrangements may communicate data over data interfaces or protocols such as Firewire, USB, Ethernet, GIGE, IEEE 802.11a, b, g, or n, or Bluetooth or ZigBee.

In another embodiment, the invention provides a spectrally-resolving camera that includes a dispersion device of the invention and image focusing optic effective to project the electromagnetic radiation spectrum corresponding to an image at the entrance aperture of the dispersion device such that the spectrum of the image impinging on the aperture is dispersed by the dispersion device and recorded by the camera. In some embodiments, the spectrally-resolving camera is attached to a moveable element in a manner effective for the image focusing optic to project a sequence of images to the aperture sequentially, randomly, or in a specified sequence in time. In some embodiments, the image focusing optic of the spectrally-resolving camera includes one or more mirrors, lenses, or a combination thereof, capable of scanning various points in a scene and projecting light from these various points to the aperture of the dispersion device. In some embodiments, the image focusing optic of the spectrally-resolving camera is a Digital Light Processor.

In another embodiment, the invention provides a method for determining absorption by a sample. The method involves placing the sample into a sample holder located between the collimating optic and diffraction gratings in an energy dispersion device of the invention, illuminating the sample with collimated light and determining the amount of light absorbed by the sample by comparing the diffraction spectra obtained in the presence of the sample with the spectra obtained in the absence of the sample. In some embodiments, the reference specimen may be characterized immediately before the sample of interest is characterized. In some embodiments, the reference spectrum may be characterized after the sample of interest is characterized. In some embodiments, the reference specimen may be characterized at a time long-removed from the moment when the sample of interest is characterized.

In another embodiment, the invention provides a method for determining the diffuse or specular reflectivity of a sample. The method involves placing the sample into a holder illuminated by a light source such as a fluorescent light, arc lamp, LED, or other light source, with the surface of the sample viewable through the entrance aperture either directly or through common optical components such as lenses, mirrors, volume holograms, or prisms. Light passing through the entrance aperture then proceeds to the collimating optic and diffraction gratings in an energy dispersion device of the invention and, thence to one or more detectors. Reflectance is determined in the manner commonly understood by those familiar with the art, by comparison of the light reaching the detector for the sample in question in comparison to that obtained from a reference specimen. In some embodiments, the reference specimen may be characterized immediately before the sample of interest is characterized. In some embodiments, the reference spectrum may be characterized after the sample of interest is characterized. In some embodiments, the reference specimen may be characterized at a time long-removed from the moment when the sample of interest is characterized.

In another embodiment, the invention provides a method for measuring fluorescence that involves determining the diffraction spectra of a fluorescent sample relative to a similar, non-fluorescent sample using an energy dispersion device of the invention. In another embodiment, the invention provides a method for measuring the phosphorescence that involves determining the diffraction spectra of a phosphorescent sample relative to a similar, non-phosphorescent sample suing the energy dispersion device of the invention.

In another embodiment, the invention provides an energy dispersion device that includes an electromagnetic radiation source, a collimating optic, and a wavelength dispersion component. The electromagnetic radiation source includes a light-emitting diode and an aperture that admits a select amount of the electromagnetic radiation from the light-emitting diode to the collimating optic. The electromagnetic radiation is collimated by the collimation optic prior to being incident on said wavelength dispersion component, and wavelength dispersion component includes three double-dispersion diffraction gratings, stack in a coplanar orientation and rotated about their normal, wherein two of the three gratings are rotated ±30° relative to one of the three gratings.

In another embodiment, the invention provides a spectrograph that includes (1) a light source such as a light-emitting diode (LED), an arc lamp, or laser; (2) a receptacle or holder for a sample or specimen capable of emitting, fluorescing, phosphorescing, or scattering light when excited by the light source; (3) a collimating mirror such as an off-axis parabola; and (4) one or more double-dispersion diffraction gratings, two or more single-dispersion diffraction gratings or any combination of these that can generate a multiplicity of diffraction orders from collimated light. The multiplicity of orders and the stray light between the orders is focused onto a detector using a suitable lens or mirror. The detector and suitable lens or mirror may or may not be mounted on the spectrograph. The lens might be associated with a camera, either integral to the camera or a demountable lens. The light is detected by an array detector such as a charge-coupled array or charge-coupled device (CCD), complementary metal oxide on silicon array (CMOS array), or charge-injection array (CID). Where a spectrograph of the invention includes a LED as light source, no stable optical bench is needed since the spectrograph can be self-calibrating in real time. Since the exact peak intensity wavelength of the LED is temperature dependent, as is the phosphorescence spectrum of any phosphor co-mounted with the LED semiconductor (rendering the LED a broad-band light source), by measuring temperature at or near the LED pn junction, the source spectrum is known and a calibration wavelength is available (J.-C. Su, S.-F. Song, and H.-S. Chen, "Chromaticity Stability of Phosphor-converted White Light-emitting Diodes with an Optical Filter," Appl. Opt. 50, 177-182 (2011)). Even in the absence of temperature measurement, approximate calibration in real time is feasible, as the wavelength shifts for LEDs at common temperatures is slight.

In another embodiment, the invention provides a spectrograph that includes (1) a light source such as a light-emitting diode (LED), an arc lamp, or laser, (2) a collimating mirror such as an off-axis parabola, (3) a jig to hold in appropriate alignment a cuvette. Into this holder is placed a cuvette to which is bonded, onto which is printed, or otherwise to which is attached a stack of diffraction gratings mutually rotated so as to generate a multiplicity of diffraction orders from collimated light. The grating-covered face of the cuvette is so positioned as to be facing away from the parabolic mirror and towards any detector array. The cuvette is positioned so that the collimated light from the parabolic mirror enters a clear face of the cuvette and exits a clear face on the outside of which is the bonded grating stack. As illustrated in FIGS. 9A through 9C, the cuvette may be of the common type widely used in spectrophotometers, or may be modified with handling tabs to make it easier for a user to avoid touching the faces of the cuvette and to assist in so designing the holding jig to assist in orienting the cuvette correctly. The multiplicity of orders and the stray light between the orders is focused onto a detector using a suitable lens or mirror. The detector and suitable lens or mirror may or may not be mounted on the spectrograph. The lens might be associated with a camera, either integral to the camera or a demountable lens. The light is detected by an array detector such as a charge-coupled array or charge-coupled device (CCD), complementary metal oxide on silicon array (CMOS array), or charge-injection array (CID).

In addition, the dynamic range (ratio of most intense measurable signal to weakest measurable signal) of a dispersion device or spectrograph of the invention is greater than the dynamic range of the detector alone. Due to differences in diffraction efficiency as a function of angle and due to vignetting of optical transmission through the gratings and lens, the relative intensity of spectra differs from order to order, as does the dispersion (spatial spread of wavelength display). Some spectra may saturate the detector, while others are in the detector's linear range, and still others are lost in stray light or dark signal. As a consequence, the dynamic range of a diffraction device or spectrograph of the invention is the product of the dynamic range of the detector and the ratio of throughput between the brightest and dimmest orders observable at once.

Dispersion devices have been patented by D. Brady et al. that use a large opening instead of a narrow slit to admit light to an energy-dispersing device such as a filter, grating, or prism. Light then falls on a Hadamard mask, a programmable, binary shutter allowing passage of selected combinations of wavelengths onto, e.g., a charge-coupled array detector. Although the throughput of these devices is higher than for similar resolution grating spectrographs of conventional design, and the Multiplex or Jacquinot Advantage of these devices allow for improved precision and throughput compared to conventional designs, unlike the invention, the dynamic range of measurement in the Brady dispersion device is similarly restricted because the dynamic range of the detector.

Any feature or combination of features described herein are included within the scope of the present invention provided that the features included in any such combination are not mutually inconsistent as will be apparent from the context, this specification, and the knowledge of one of ordinary skill in the art.

Unless otherwise defined, all technical and scientific terms used herein have the same meaning as commonly understood by one of ordinary skill in the art to which this invention belongs. In case of conflict, the present specification, including definitions, will control. In addition, the materials, methods, and examples are illustrative only and not intended to be limiting. Although methods and materials similar or equivalent to those described herein can be used to practice the invention, suitable methods and materials are described below.

All patents and publications referenced or mentioned herein are indicative of the levels of skill of those skilled in the art to which the invention pertains, and each such referenced patent or publication is hereby incorporated by reference to the same extent as if it had been incorporated by reference in its entirely individually or set forth herein in its entirety. Applicants reserve the right to physically incorporate into this specification any and all materials and information from any such cited patents and publications.

Other features and advantages of the invention will be apparent from the following detailed description and from the claims.

DETAILED DESCRIPTION OF THE INVENTION

The invention provides an energy dispersion device that uses the intensity of electromagnetic radiation (e.g. light of various colors over a range of wavelengths) to evaluate the composition of matter. The dispersion device of the invention can be coupled to a multi-pixel detector. The invention also provides a method of using the device that is based on spectral information related to intensity/wavelength of electromagnetic radiation.

Components & Layout

An energy dispersion device of the invention includes a limiting aperture for admitting light or other electromagnetic radiation (EMR), collimation optic, and wavelength dispersion component, i.e., diffraction gratings. The device can also include a light or other EMR source, sample holder, focusing optic and detector. The components are arranged so that the light or EMR is collimated before it reaches the wavelength dispersion component. Collimation can be performed with a single optic, for example, a parabolic mirror such as an off-axis parabola or replica parabola or low-chromatic-aberration aspheric (e.g. compound) lens. The collimated light or other EMR can be directed through a sample holder, for example, a 1 cm path length cuvette of common design. Alternatively, the light or other EMR from a sample or reference can be focused through an aperture of suitable size at the focus of the parabolic mirror or at the focus of a compound, achromatic, apochromatic or superapochromatic lens. In either case, the pre-dispersion portion of the instrument includes: optionally, a light source; limiting aperture; collimation optics; optionally, a sample holder and sample. Light or other EMR is then incident on a stack of transmission diffraction gratings that generate many diffraction orders that can be observed with a low-aberration lens and array camera, for example, a CMOS camera, a charge-coupled array, charge-injection array, diode array, or several such arrays.

The power source for the energy dispersion device can be a USB port on, e.g., a computer, cell phone, or digital camera. The USB2 port is typically rated as a source for 20 mA at 5 V. This is sufficient to power some common light sources, such as a white LED. The power source can also be a battery such as a lithium ion battery, or a power supply such as an AC adapter.

Figure 1A:
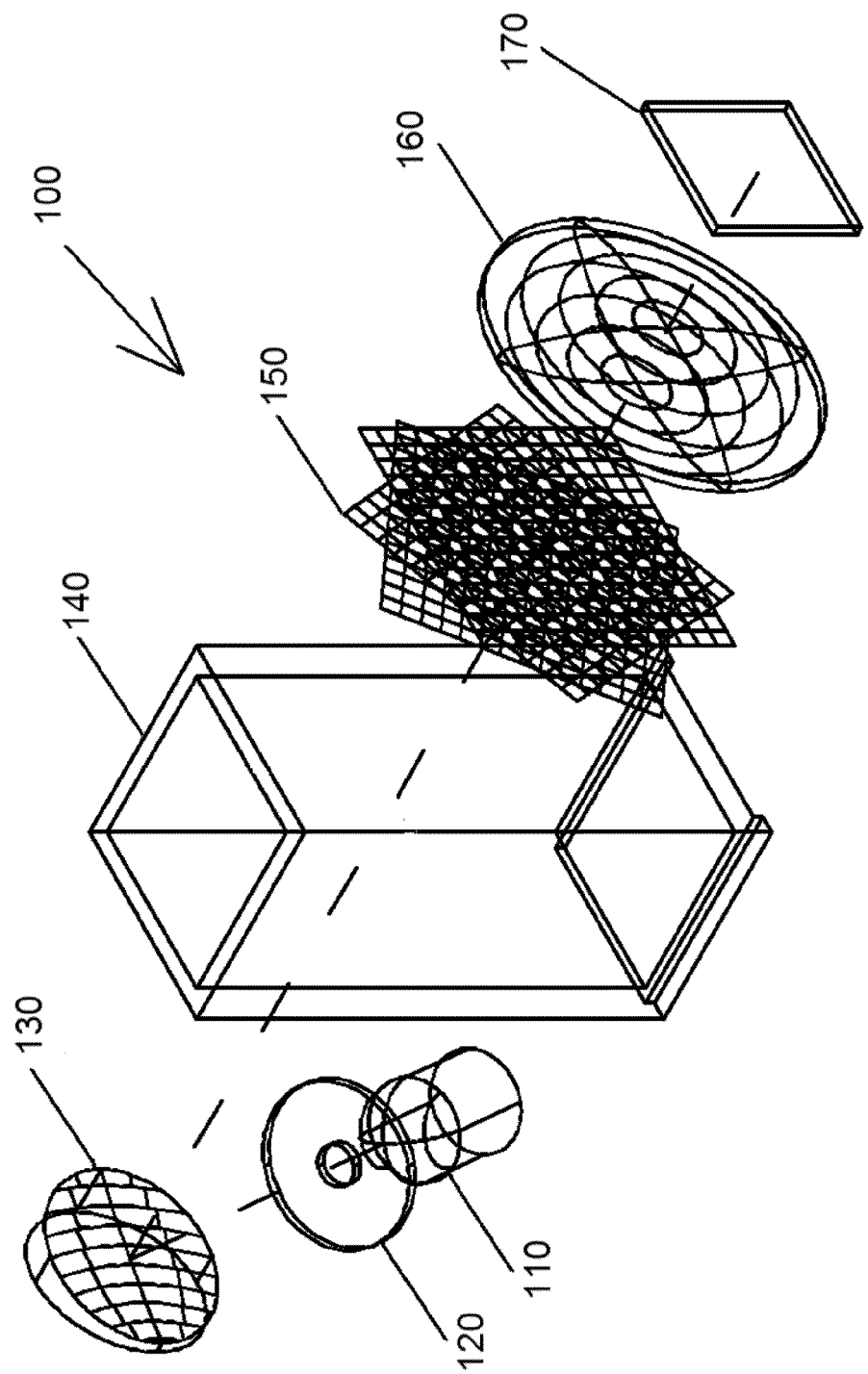
FIG. 1A is a perspective view of the layout of the components of a spectrograph according to one embodiment of the invention.
Figure 1B:
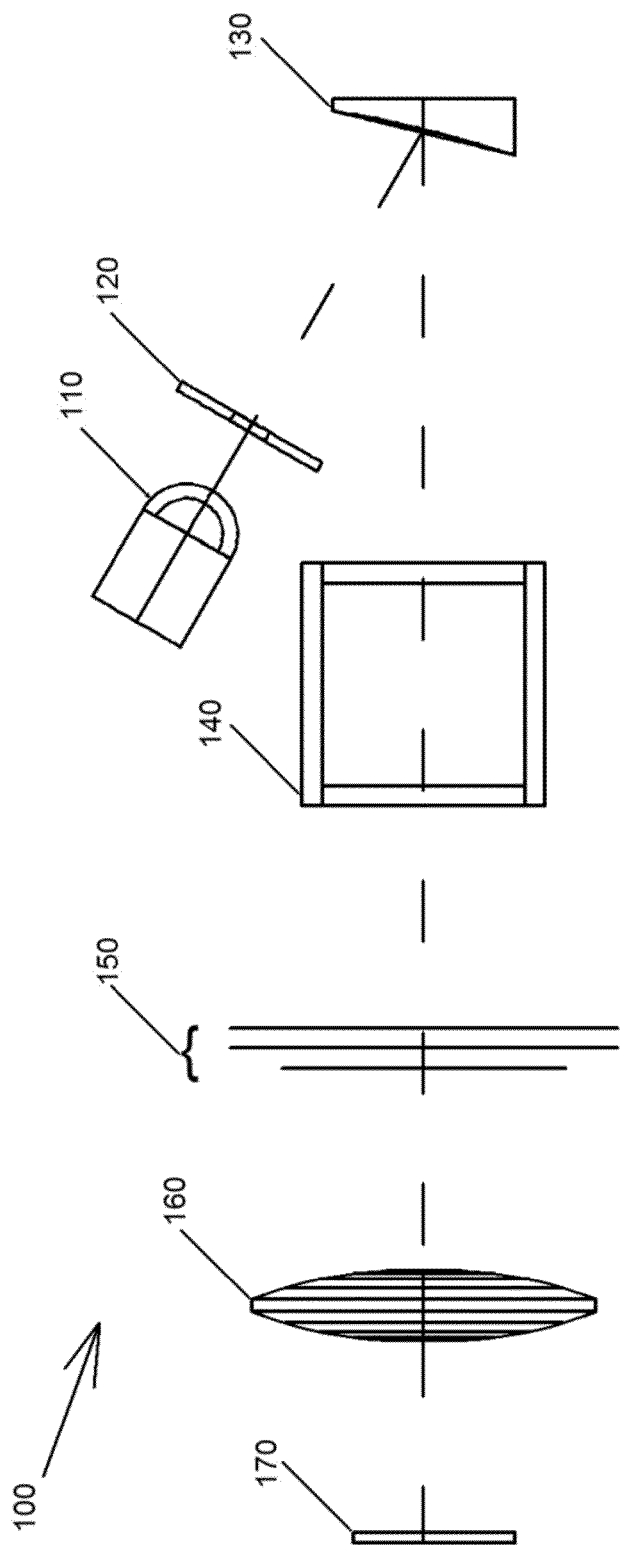
FIG. 1B is a plan view of the same layout.

FIG. 1A is a perspective view of an example of a layout of a spectrograph 100 according to one embodiment of the invention. FIG. 1B is a plan view of the same layout. The components of the spectrograph 100 include a light source 110, a limiting aperture 120 to admit light from the light source 110 to the remainder of the instrument, a collimation optic 130, a sample holder 140, a stack of gratings 150, a focusing optic 160, and an array detector 170. The light source 110 is shown as an LED. The distance between the limiting aperture 120 and the collimation optic 130 is such that light reflected from the collimation optic 130 to the sample holder 140 is collimated. The collimation optic 130 is shown as an off-axis parabolic mirror with an off-axis angle of approximately 30°. In this layout, the sample holder 140 can be a cuvette of common design. The stack of gratings 150 is shown as a stack of three mutually-rotated, about co-planar double-dispersion transmission gratings. The focusing optic 160 is shown as a lens. The array detector 170 can be a CMOS camera. The dashed line is the optical axis, passing through the limiting aperture 120 and through or about through the centers of the limiting aperture 120, the collimation optic 130, the sample holder 140, the stack of gratings 150, and the focusing optic 160. The optical axis may intersect the center of the array detector 170, but may not do so in some embodiments. The optical axis, as known to those skilled in the art, is not a physical, tangible object. The components are enclosed in a case or housing to keep undesired (stray) light away from the system as is known to one skilled in the art of spectrometry. It is apparent to one skilled in the art of spectroscopy that light baffles and a case or housing for the components are omitted for clarity.

The light source 110 and sample holder 140 can be built directly into the spectrograph 100. The light source 110 can be any source of visible light or other electromagnetic radiation as described herein. Alternatively, fiber optics can be used to remotely observe absorption, fluorescence, reflection, or scattering from a remote light source, in which case, the distal end of a fiber can be used to input light from the remote light source to the cross-dispersion apparatus at the location of the limiting aperture 120. The limiting aperture 120 can be a pinhole or other small aperture as described herein. The collimation optic 130 can alternatively be an off-axis parabolic mirror with an off-axis angle of 60° or 90°, or can be yet other alternate embodiments as described herein. The sample holder 140 can alternatively be positioned behind the limiting aperture 120, or a sample may be incorporated into embodiments of the invention by other configurations as described herein. The stack of gratings 150 can be any combination of gratings as described herein. The focusing optic 160 can alternatively be any lens, mirror, or other optic suitable for focusing light as described herein. The array detector 170 can be any suitable detector or electronic camera as described herein.

Light or Other Electromagnetic Radiation (EMR) Sources

The light or other EMR source can be a light-emitting diode (LED), tungsten-halogen lamp, deuterium lamp, electroluminescent panel, or fluorophore or phosphor indirectly illuminated with a light-emitting diode, laser, or any of the light or other EMR sources already listed or commonly used for spectrometric applications. The light or other EMR source can be a white LED that can be used to generate a continuous spectrum from approximately 410 nm to approximately 700 nm. The LED can be one that produces a stable spectrum at fixed temperature over long periods of time, e.g., hundreds of hours at high precision or up to 50,000 hours before burn-out. An example of a useful LED is the RL-5-W5020 white LED that produces a continuous spectrum from 420 to 720 nm, with peak emission from a blue LED (i.e. primary source LED) near 450 nm; broad green to red emission due to a rare earth aluminum oxide phosphor, similar to that used in fluorescent lightbulbs.

Measurement of absorption, reflection, scattering, and luminescence can be performed in the visible range, though measurements at wavelengths down to 300 nm are also possible. Thus, the light or other EMR source can be a 300 nm white LED with two phosphors, one to cover the 300-470 nm region and the other yttrium aluminum oxide or other similar material, so that emission covers the region in which common transparent polymers are transparent. A light or other EMR source can consist of two, closely-spaced LEDs, one with a wavelength at or near 300 nm and the other with a wavelength at or near 450 nm, each phosphor- or fluorophor-overcoated, so that the entire visible and polymer-transparent ultraviolet spectrum can be generated simultaneously. Regardless of wavelength range, the source is selected to be sufficiently bright to produce a useful image quickly, to minimize the effect of dark current in the array detector.

In some cases, the light or other EMR is derived from the sample to be analyzed. In fluorescence or phosphorescence, for example, a substance absorbs light or other EMR of one wavelength and emits light or EMR at a different wavelength. In bioluminescence, the light is emitted by a living organism, while in chemiluminescence, the light emitted is a result of a chemical reaction.

In some cases, the light or other EMR can be obtained by the image focusing lens or mirror of a camera or telescope aimed at a selected object, scene, region in space or EMR signal. The light or other EMR can be obtained by directing the image focusing lens or mirror to a specific point in space and time. Alternatively, the light or other EMR can be obtained over a period of time, region of space or sequence of events. As such, the image focusing lens or mirror can be a part of a spectrally-resolving camera that is attached to a moveable element, thereby, permitting the camera to scan a selected scene or region of space. Alternatively, one or more of the focusing lens or mirror can scan a selected scene or region in space to obtain spectral data.

In all cases, the light or other EMR can be concentrated to a small spot at which is positioned a small, limiting aperture through which the light or other EMR effuses into the rest of the instrument. Apertures in the range of 25 μm to 200 μm, inclusive, can be used. For example, a nickel film pinhole aperture of diameter 50 μm can be used. Where the light or other EMR is derived from the sample to be analyzed, no sample cuvette is interposed in the collimated light between the pinhole and the gratings. For fluorescence measurements, the sample can be located directly behind the pinhole and illuminated with a selected range of wavelengths. Only fluorescent light admitted through the pinhole is collimated and diffracted. Phosphorescent samples are also placed directly behind the pinhole so that only phosphorescent light admitted through the pinhole is collimated and diffracted. Similarly, for reflectance measurements, the sample can be positioned behind the pinhole and illuminated with a continuum source.

Collimation

In the invention, diffraction gratings are illuminated with collimated light. Since light from a point source (e.g. light through a 50 μm pinhole or limiting aperture) is to be collimated, a parabolic mirror or compound, achromatic, apochromatic or superachromatic lens can be used. Examples include an off-axis parabolic mirror or replica parabola, which are convenient from an engineering and instrument footprint view. To collimate light or other EMR admitted though a point source such as a pinhole or limiting aperture, the pinhole or limiting aperture is placed at the focus of the lens or mirror. The pinhole or aperture can be placed behind the collimating mirror or lens.

All wavelengths to be detected are collimated, with beam width sufficient to fill (or nearly fill) the width of the sample cuvette (if used), and to fill (or nearly fill) the width of the diffraction gratings observed by the camera. Although some departure from perfect collimation is characteristic of optical systems, excessive lack of collimation is minimized so as to avoid the increased stray light/decreased resolution that leads to limited instrument performance.

Absorption Sample Cell, Fluorescence Cell, Reflectance

Figure 9A:
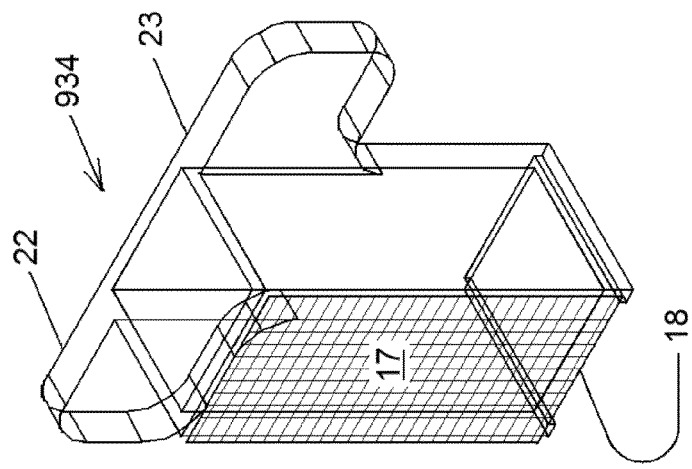
FIG. 9A is a perspective view of a bonded cuvette according to an embodiment of the invention, where stacked, mutually rotated gratings are bonded directly to the output face of a common spectrophotometer cuvette.
Figure 9B:
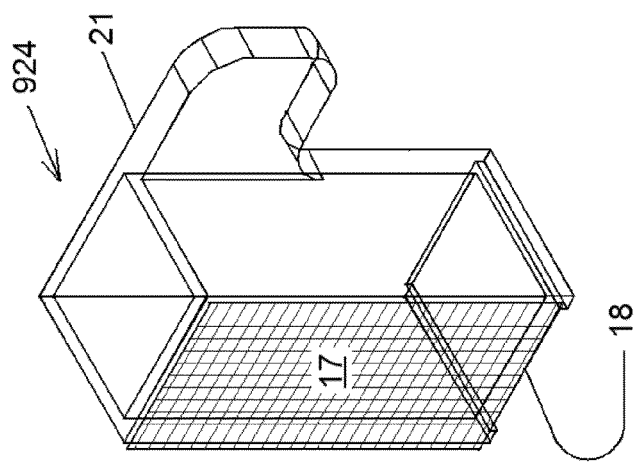
FIG. 9B is a perspective view of a single-tab bonded cuvette according to an embodiment of the invention, similar to that in FIG. 9A but with a handling tab molded as part of the cuvette.
Figure 9C:
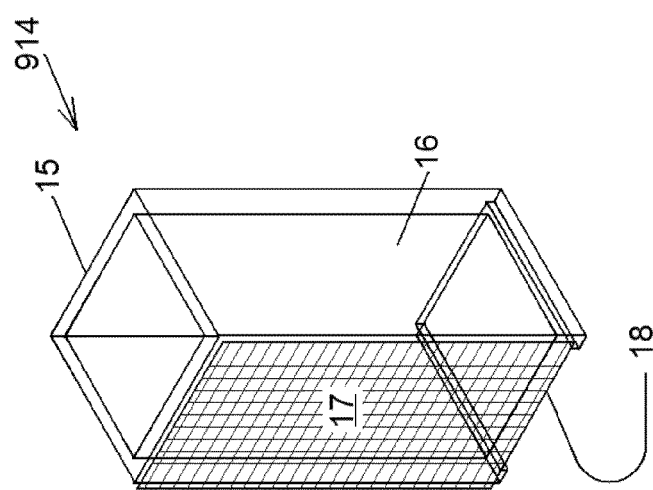
FIG. 9C is a perspective view of a double-tab bonded cuvette according to an embodiment of the invention, similar to FIGS. 9A and 9B, but where two handles are molded into the cuvette.

For absorption measurements, the sample can be placed in the collimated beam between the collimating optic and the diffraction gratings, typically close to but not in contact with the diffraction gratings as shown in FIGS. 1A and 1B. The sample can be placed in a square or rectangular cuvette made of quartz, glass, or transparent polymer. Absorption measurements can be performed with collimated light transiting the cuvette. Alternatively, in embodiments of the invention, diffraction gratings may be attached to, imprinted upon, or otherwise formed with the cuvette as shown in FIGS. 9A through 9C, so that the spectrum is, in effect, dispersed as collimated light exits the cuvette. For example, diffraction gratings may be glued to a face of the cuvette, printed upon a face of the cuvette, or embossed upon a face of the cuvette. A bonded combination of a cuvette with diffraction gratings may be disposable or reusable.

FIGS. 9A through 9C are perspective views of embodiments of the invention in which the stacked, rotated gratings are bonded to the transparent face of a sample holder or cuvette. FIG. 9A shows a bonded cuvette 914 according to an embodiment of the invention, where a stack of mutually rotated gratings 18 is bonded directly to the output face 17 of a common spectrophotometer cuvette 16. The clear face 15 of the spectrophotometer cuvette 16, through which light enters, has no gratings or other coatings (except, perhaps, an anti-reflection coating). FIG. 9B shows a single-tab bonded cuvette 924 according to an embodiment of the invention, similar to the bonded cuvette 914 of FIG. 9A, but with a handling tab 21 molded as part of the cuvette. FIG. 9C shows a double-tab bonded cuvette 934 according to an embodiment of the invention, similar to the bonded cuvette 914 of FIG. 9A and the single-tab bonded cuvette 924 of FIG. 9B, but where two handles 22 and 23 are molded into the cuvette. FIGS. 9B and 9C show embodiments that assist users in keeping the grating-covered face clean and simplifying design of cuvette holders which correctly orient the grating-covered faces as the face through which light exits towards a detector. For clarity, only the groove orientation for a single double-dispersion diffraction grating is shown in the sketch. A stack of two or more gratings is present by implication.

For fluorescence, phosphorescence or reflectance measurements, a sample that fluoresces, phosphoresces, or reflects light (specularly or diffusely) is placed behind a limiting aperture—in the location of the light source 110 shown in FIGS. 1A and 1B. In this case, fluorescent, phosphorescent or reflected light that is admitted through the limiting aperture is collimated before it reaches the diffraction gratings (fluoresced or reflected light is inherently not collimated as it is emitted or scattered over a wide range of angles). In some embodiments, a sample to be used for fluorescence or phosphorescence measurements can be placed in a capillary. The capillary can be illuminated with a light source tuned to a line, band, or region capable of exciting the desired optical process. The light can be projected axially down the capillary or transversely across the capillary. The illumination can be focused and masked so as to avoid getting exciting light into the region of the device beyond the limiting aperture. As known to one of skill in the art, the geometry useful for fluorescence or phosphorescence measurements can also be used for chemiluminescence or bioluminescence analysis.

For reflectance measurements, generally known illumination geometries will generate a light beam that can be directed towards or focused through the limiting aperture.

Diffraction Gratings

To separate a light beam into its spectrum (a distribution of the amount of light as a function of frequency, energy, or wavelength of the individual photons), a diffraction grating can be used. A diffraction grating can be made using numerous methods known to those of skill in the art. For example, a diffraction grating can be made by diamond scribing soft metals and replicating the resulting corrugated pattern onto a substrate, by exposing photoresists to interference patterns generated by lasers and appropriate additional optics, or by generating a hologram in photographic or polymer film.

Diffraction gratings can reflect or transmit light. Reflection gratings, as well as single transmission gratings can be used in spectrographs, spectrometers, and spectrophotometers, as known to those of skill in the art. The diffraction gratings used in the invention can be reflection gratings, transmission gratings, phase gratings embossed on a transparent polymer such as mylar, holographically recorded in a material (holographic film) or any combination of these. The pattern of colors following such gratings varies with angle, as the grooves or other patterns in diffraction gratings cause phase shifts in the electromagnetic waves of the incident light beam. The equation governing spreading of wavelengths (or dispersion) by individual diffraction gratings is known to those skilled in the art. For an individual grating, $$n\lambda = d(\sin\alpha + \sin\beta) \qquad (1)$$

where n is the diffraction order and an integer, $\lambda$ is the wavelength of light in the medium in which the grating is immersed (typically air, but any transparent substance is plausible), d is the width of a single groove or line of the grating, $\alpha$ is the angle between the normal to the grating surface and the incident light ray, and $\beta$ is the angle between the normal and the exiting light ray, i.e. angle of diffraction from the grating, measured with the same handedness as $\alpha$. The sign convention in this equation is that, when n=0, $\alpha$=−$\beta$.

Typically, light is collimated so that all light rays impinging on the grating are parallel. This is geometrically equivalent to placing a light source an infinite distance from the grating. In practice, a finite-sized optic can be used. The incident light, which is collimated, reaches the gratings at $\alpha$=0. At the first grating, equation 1 can be simplified to:

$$n\lambda = d\sin\beta \qquad (2)$$

If the gratings used have 500 grooves per mm and a d value of 2 µm, for dispersion in a single direction (symmetrical about $\beta$=0), then for the ends of the spectra:

| n | β for λ = 400 nm | β for λ = 700 nm |
|---|---|---|
| 0 | 0 | 0 |
| 1 | 11.57° | 20.49° |
| 2 | 23.58° | 44.43° |
| 3 | 36.87° | >90° |
| 4 | 53.13° | >90° |

The values in the table show that 2nd order is the highest complete order for single gratings where diffraction is along the x or y axes. To see the full second order spectra, the lens must be close enough to the grating to pick up a 90° swath of solid angle. It is likely focused at infinity so that the spectra appear to radiate from the LED.

Figure 5:
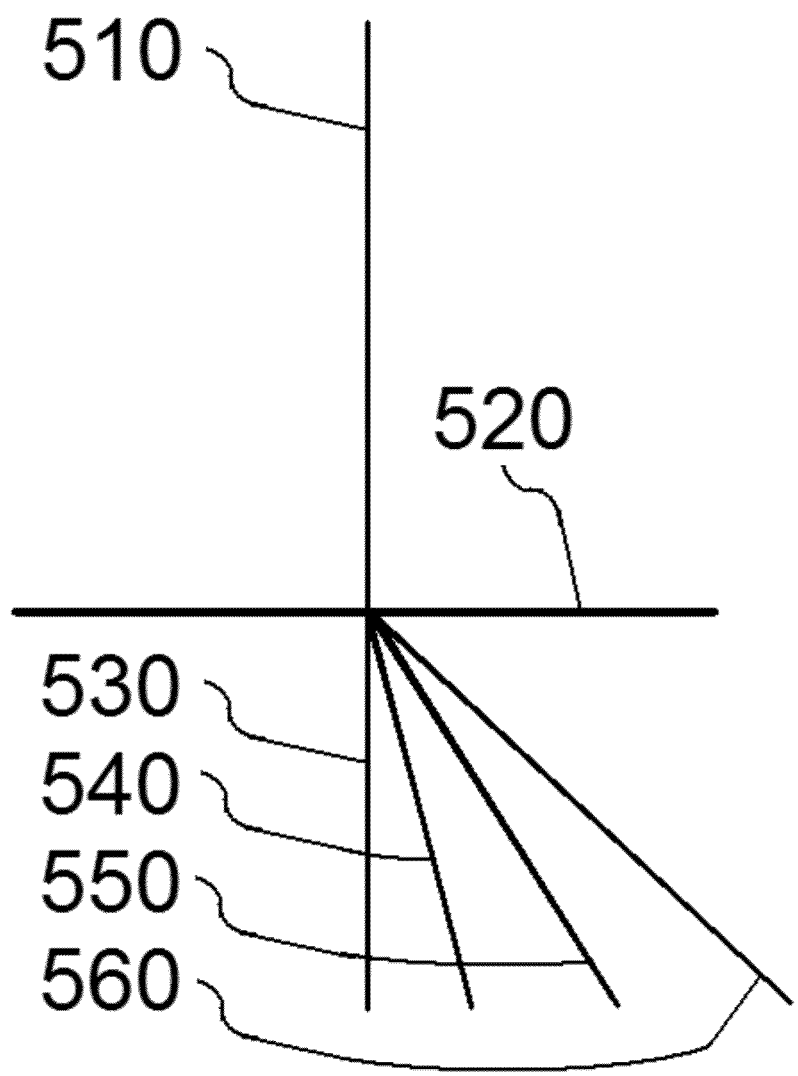
FIG. 5 shows the origin of multiple diffraction orders for a single, linear diffraction grating.

FIG. 5 shows the origin of multiple diffraction orders for a single, linear diffraction grating, illustrating the incident, collimated light 510; the diffraction grating 520; the zero-order diffracted light 530, where n=0, so the beam is undeviated; the first-order diffracted light 540, where n=1, so β approximately equals 14.48°; the second-order diffracted light 550, where n=2, so β equals 30.0°; and the third-order diffracted light 560, where n=3, so β approximately equals 48.59°. The incident light 510, typically polychromatic, is construed as monochromatic for the purpose of illustration. This assumes that light is normally incident on the grating, a 500 lines per millimeter grating period (2 micrometer groove spacing), and a wavelength of 500 nm. In this case, the grating equation is n 500 nm=2000 nm sin β, or sin β=0.25n. For this wavelength and groove density, n=4 emerges at β=90°, tangent to the grating surface. Negative orders also appear, but are not shown.

When dispersion is in two dimensions, diffraction from the original beam can be oriented at angles other than 0° and 90°. If n=1 in both the x and y directions, the overall dispersion in the (1,1) spectrum is expanded by $(1^2+1^2)^{1/2}=2^{1/2}$, as per the Pythagorean theorem. If two wavelengths are separated by 1 mm in x direction, they are also separated by 1 mm in the y direction, and thus by 1.414 mm along the axis of the spectrum, 45° to either axis. Thus, better resolution can be generated between the axes than on the axes, all else being equal.

Figure 6:
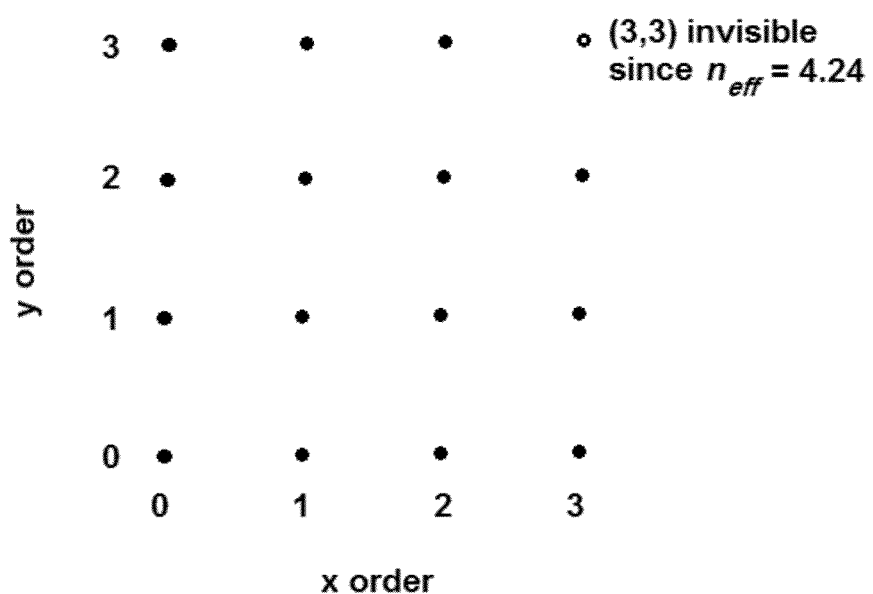
FIG. 6 shows the origin of multiple diffraction orders for a single, bi-linear double-dispersion diffraction grating.

FIG. 6 shows the origin of multiple diffraction orders for a single, bi-linear double-dispersion diffraction grating. This is viewed perpendicular to the optical axis and only one quadrant (all positive orders) is shown, with zero order for both horizontal and vertical dispersion at the lower left. Orders in the x direction correspond to item numbers 530, 540, 550, and 560 in FIG. 5. The effective order number is $$\sqrt{n_x^2+n_y^2}.$$

For the example with 500 nm light and 2000 nm groove spacing, the maximum visible order is for effective order <4. Variation of dispersion with order number is not shown.

Thus, while a given wavelength may diffract into many orders n, n=0, 1, 2, . . . , the relative positions of these orders is well defined in terms of the grating groove width d, the incidence angle of all incoming wavelengths, α, and the n and λ dependent angle β. If light is normally incident on a grating, α=0 and nλ=d sin β. Since d is fixed at the moment of manufacture, the various values of n can be readily identified. Furthermore changes in d, due to mechanical stress, temperature or humidity, can be regressively fitted by simultaneously observing multiple orders.

To generate a number of cylindrically-arranged multiple diffraction orders, a sequence of reflectance gratings or a stack of transmission diffraction gratings (which may be simpler and least expensive) can be used. Gratings having linear, parallel rulings or crossed, "double dispersion" rulings can be used. At least one double-dispersion diffraction grating or a stack of two or more single- or double-dispersion diffraction gratings can be used in a device of the invention. Furthermore, a combination of single- and double-dispersion diffraction gratings can also be used. The separation and pitch of the gratings in the stack are generally the same so dispersion is approximately cylindrically-symmetrical. Intentionally using different spacings for different gratings yields non-cylindrical symmetry, but otherwise works in a similar manner, as is obvious to one with skill in the art. Where more than one grating is used, the gratings are stacked in about a co-planar orientation and rotated about their normal. Thus, each grating is rotated with respect to each of the other gratings in the stack. The gratings can be rotated at any angle, provided that the smallest angle of rotation for all gratings in the stack is approximately equal.

For example, according to embodiments of the present invention, a stack of two, three, four, five, six or nine single-dispersion diffraction gratings rotated about their normal with respect to each of the other gratings can be used in a device of the invention. Where a stack of two single-dispersion diffraction gratings is used, each grating can be rotated 90° with respect to the other grating such that the stack resembles a cross-dispersion grating. Where a stack of three single-dispersion diffraction gratings is used, each grating can be rotated +60° or −60° with respect to the other two gratings in the stack. Where a stack of four single-dispersion diffraction gratings is used, each grating can be rotated 45° with respect to another grating in the stack such that the stack resembles two cross-dispersion gratings rotated about their normal at 45°. Where a stack of five single-dispersion diffraction gratings is used, each grating can be rotated 36° with respect to another grating in the stack. Where a stack of six single-dispersion diffraction gratings is used, each grating can be rotated 30° with respect to another grating such that the stack resembles three cross-dispersion gratings, each rotated about their normal at 30° with respect to another grating in the stack. Where a stack of eight single-dispersion diffraction gratings is used, each grating can be rotated 22.5° with respect to another grating in the stack. Where a stack of nine single-dispersion diffraction gratings is used, each grating can be rotated 20° with respect to another grating in the stack. According to these embodiments of the present invention, a smallest angle of rotation between any two gratings in the stack of two, three, four, five, six, eight and nine co-planar, single-dispersion diffraction gratings may be 90°, 60°, 45°, 36°, 30°, 22.5° and 20°, respectively.

Alternatively, according to embodiments of the present invention, a stack of co-planar, double-dispersion diffraction gratings rotated about their normal can also be used. Where two double-dispersion diffraction gratings are used, one grating can be rotated 45° with respect to the other. Where three double-dispersion diffraction gratings are used, each grating can be rotated 30° with respect to another grating in the stack. Where four double-dispersion diffraction gratings are used, each grating can be rotated 22.5° with respect to another grating in the stack. Where five double-dispersion diffraction gratings are used, each grating can be rotated 18° with respect to another grating in the stack. Where six double-dispersion diffraction gratings are used, each grating can be rotated 15° with respect to another grating in the stack. Where nine double-dispersion diffraction gratings are used, each grating can be rotated 10° with respect to another grating in the stack. According to these embodiments of the present invention, a smallest angle of rotation between any two gratings in the stack of two, three, four five, six or nine co-planar, double-dispersion diffraction gratings may be 45°, 30°, 22.5°, 18°, 15° and 10°, respectively.

A combination of single- and double-dispersion diffraction gratings can also be used. For example one double-dispersion diffraction grating and two or four single-dispersion diffraction gratings can be used. Where the double-dispersion diffraction grating is stacked with two single-dispersion diffraction gratings, all rotated about their normal, one single-dispersion diffraction grating can be rotated about +45° and the other −45° with respect to the double-dispersion diffraction grating. Where the double-dispersion diffraction grating is stacked with four single-dispersion diffraction gratings, all rotated about their normal, each single-dispersion diffraction grating can be rotated about +30° or −30° with respect to an axis of symmetry of the double-dispersion diffraction grating. In addition, two double-dispersion diffraction gratings can be used with two single-dispersion diffraction gratings. In this case, the gratings can be stacked and all rotated about their normal such that each grating is rotated about 30° with respect to another grating in the stack.

Figure 2:
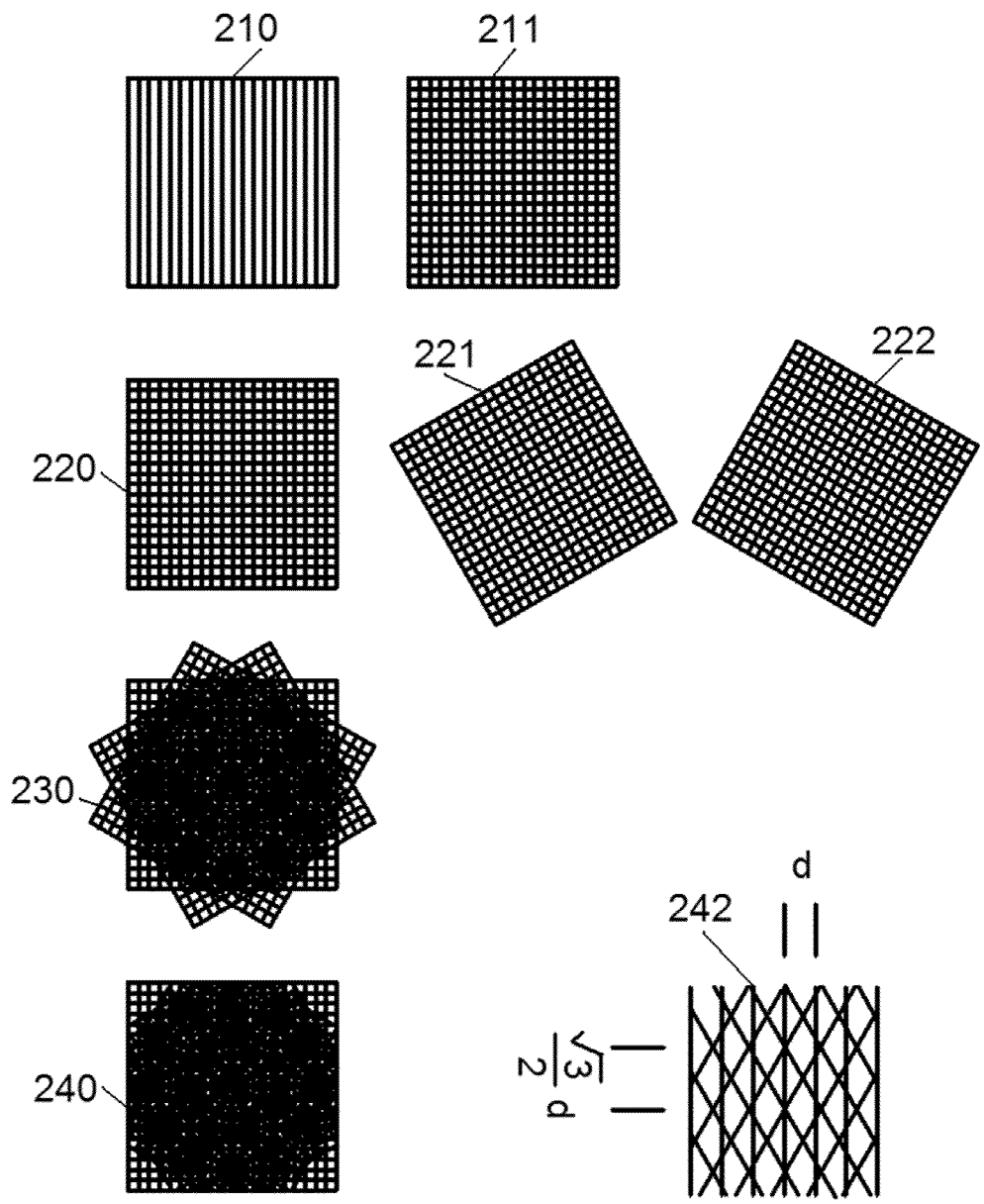
FIG. 2 illustrates examples of a single-dispersion diffraction grating, a double-dispersion diffraction grating, and three transmission gratings stacked and rotated about their common normal axis.

FIG. 2 shows examples of a common, single-dispersion diffraction grating 210 with rulings, phase variations, or other periodic structures all parallel to each other and parallel to one edge of the grating, and of a double-dispersion diffraction grating 211 with rulings, phase variations, or periodic structures in two, typically perpendicular, directions.

FIG. 2 further shows the orientation of a double-dispersion diffraction grating at a fixed orientation 220, and two nominally identical double-dispersion diffraction gratings rotated ±30°, respectively 221 and 222, relative to the orientation of the first.

FIG. 2 further shows a stacking of three double-dispersion diffraction gratings, where excess material outside the geometric boundary of the unrotated grating is shown both untrimmed in an untrimmed stack 230 and trimmed for mechanical convenience in a trimmed stack 240.

FIG. 2 further provides a magnified view 242 of one set of lines, showing spacing d and larger structures created by one set of rotated grooves.

Thus, in one embodiment, the diffraction gratings can be a stack of three plastic film, double-dispersion, phase gratings. Each grating's rulings can be rotated, for example, approximately 30 degrees of arc with respect to the rulings of the adjacent grating as shown in FIG. 2. In this case, each grating can generate multiple orders as shown qualitatively in FIG. 6. For a particular set of parallel rulings, several diffraction orders disperses such that the rulings seem to be parallel to an axis about which the different colored rays pivot. For a particular wavelength $\lambda$, assuming collimation of incident light, all integer values of m such that $m\lambda = d \sin \beta$ gives rise to observable light provided that $|m\lambda/d|<1$ and that $\beta$ falls within the acceptance angle of the lens interposed between the gratings and the detector. Wide angle lenses, suitably-positioned, record more orders than narrow angle lenses. The perpendicular rulings also give rise to diffraction, and to spectra that are perpendicular to those generated by the first set of parallel rulings mentioned. Thus, $m_x\lambda = d \sin \beta_x$ for dispersion from rulings parallel to the Cartesian y axis, while $m_y\lambda = d \sin \beta_y$ for dispersion from rulings parallel to the Cartesian x axis. In addition, there are intermediate orders due to diffraction from both ruling axes; $m_{eff}\lambda = d \sin \beta_{eff}$, with $m_{eff}2 = m_x2 + m_y2$. In this case, any pair of integers ($m_x$, $m_y$) can apply, restricted only by $|m_{eff}\lambda/d|<1$. The operation of a single double-dispersion grating, as described here, is well known to those skilled in the art.

Figure 3:
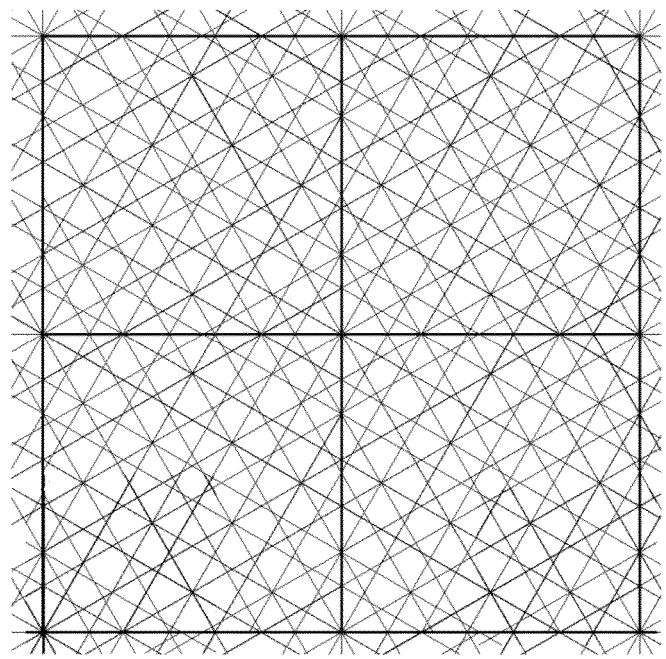
FIG. 3 is a magnified view of a small section of the stacked, mutually-rotated gratings of FIG. 2, showing many groove periodicities.

Because there are multiple gratings, each one sets up its own dispersion pattern as described above. In addition, diffraction from patterns created by the grating stack can add orders, ghosts, and other anomalies to the diffraction pattern. Any portion of the grating stack that generates repeated structural patterns can give rise to diffraction phenomena. As shown in FIG. 2, the rotation of one grating with respect to another by 30° creates structures with scales both coarser and finer than the rulings of the gratings. In cases where plastic film gratings are used, the long-range coherence of the rulings can be poor, but the stray light can be indicative of the level of total light. In the zoomed-in sketch of groove alignment in FIG. 3, features that are smaller or larger than d, the nominal groove spacing (spacing between the darker lines in the sketch) can be seen. From Euclidean geometry, for 30-60-90 right triangles, features on many scales including but not limited to $2^{1/2}$ d, $3^{1/2}/2$ d, d/2, 3d/2, etc. can be seen. Thus many families of diffraction orders can be obtained.

Figure 4:
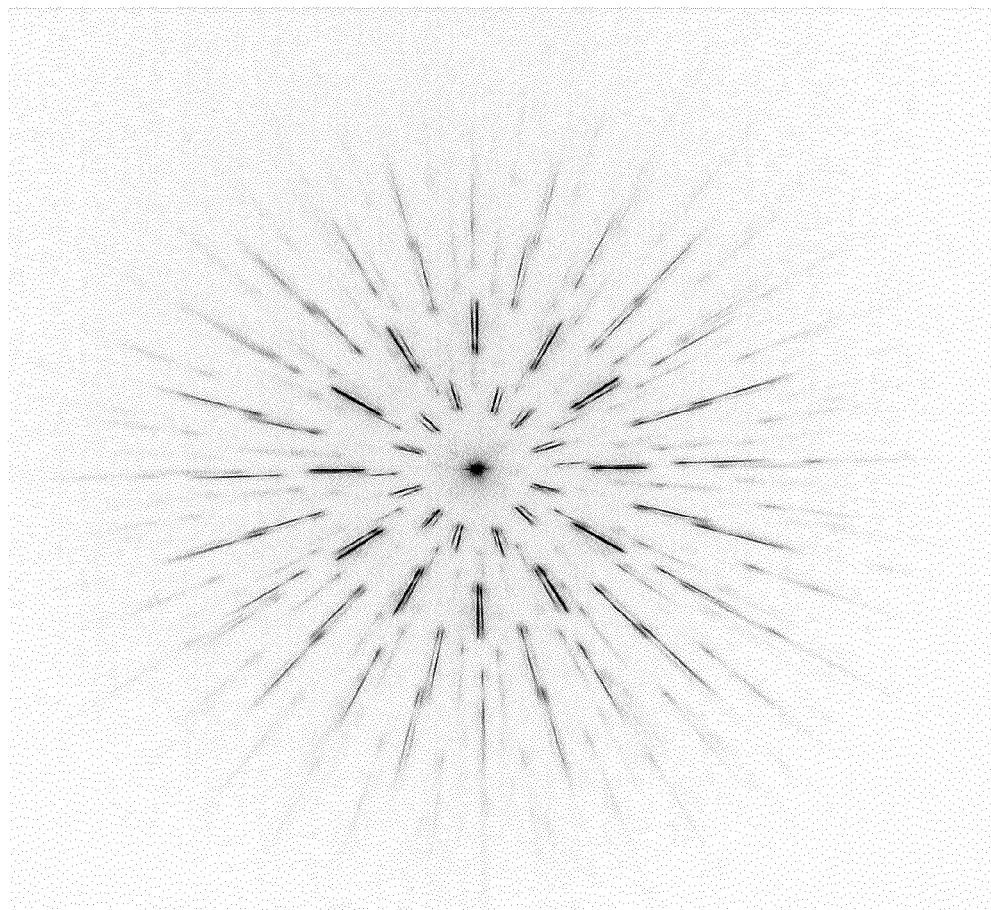
FIG. 4 is an example of a starburst spectrum generated by a spectrograph of the invention and shown in monochrome/gray scale.

A spectrum showing the many orders, stray light between orders, varying dispersion in the various families of orders, and multiple orders with similar or identical dispersion, thus allowing signal averaging from many pixels, is provided in FIG. 4. The multiple families of orders allow calibration of wavelength from data obtained in each readout of the detector. The multiple families of orders can be averaged to improve photometric precision. The varying throughput among orders means that the same wavelength's intensity can be measured over a dynamic range approximated by (dynamic range of individual pixels) times (throughput range for a wavelength in various orders). If the signal is so intense that some orders saturate for a given exposure, orders with lower throughput can still give linear response. If the signal is so weak that some orders are invisible, the stronger orders can still give usable data. There is an approximately inverse relationship between dispersion/resolution and throughput. Thus, strong signals can be interpreted at higher resolution than weak signals, with the optimum tradeoff discerned after the data are obtained. Thus, the invention allows for the potential real-time trade-off among throughput, resolution, signal averaging, dynamic range, and detector characteristics.

Where plastic film diffraction gratings are used, the mechanical quality of these gratings can result in poor spatial coherence and few, repeatable, long range (spatial), high frequency (inverse spatial) rulings. However, the significant stray light that can be generated, giving between-order data, can be used to determine total light throughput in the system and assist in normalization of light intensity within orders. The stray light can also serve as a background which is subtracted from within-order spectra.

Thus, the diffraction gratings in an energy dispersion device or method of the invention can be a set of three double-dispersion transmissive phase gratings, rotated, for example, approximately, 0°, or + or −30°, 45°, 60° or 75°, with respect to a reference axis. Other rotation angles, a number of gratings other than three, or two or more single-dispersion diffraction gratings can also be used. Any number of dispersion directions of two or higher can be used so long as all the orders are observed by one or more detectors, including array detectors, simultaneously.

Figure 7:
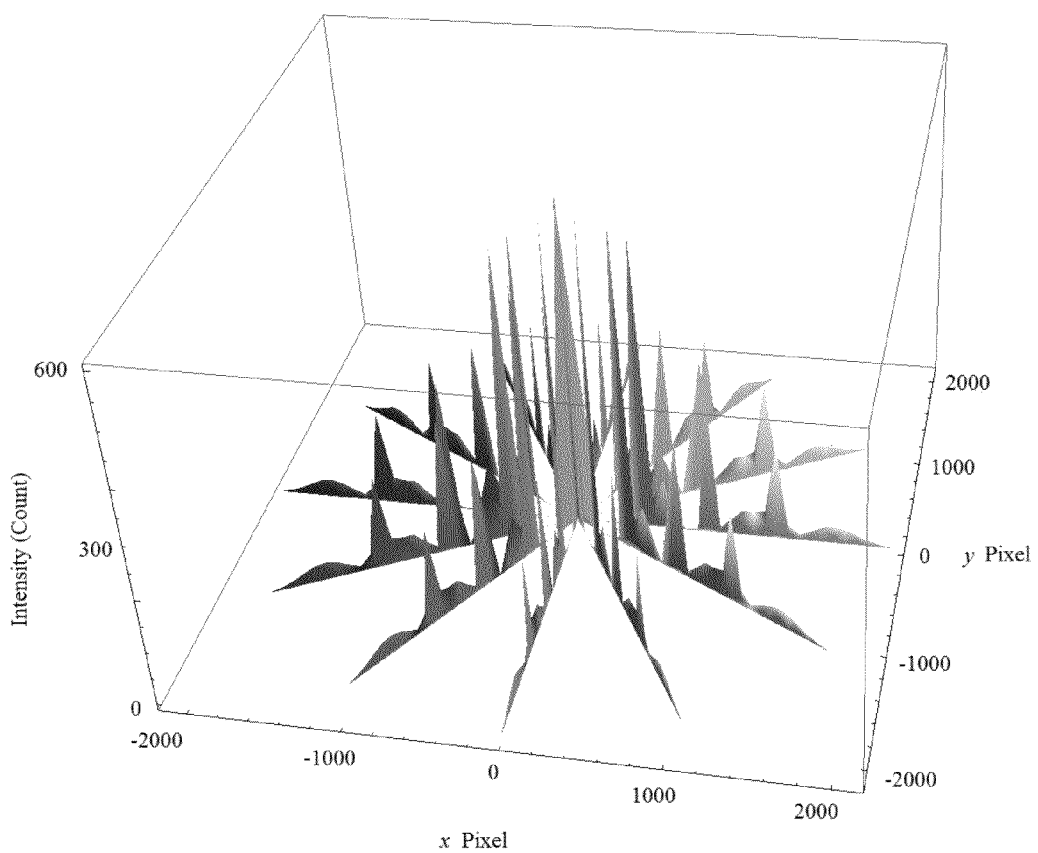
FIG. 7 shows multiple orders for a set of three-stacked, double-dispersion diffraction gratings.

FIG. 7 shows multiple orders for a set of three-stacked, double-dispersion diffraction gratings. The effect of angular spacing variation with order is included and all inter-order angles are assumed to be multiples of 30°. Only a subset of expected orders, i.e. those diffracted by a single direction of the double-dispersion diffraction gratings, is shown. That is, in the effective order number, $$\sqrt{n_x^2+n_y^2},$$

only one of $n_x$ or $n_y$ is non-zero. Simulated spectra show intensity (vertical axis) as a function of position on an x-y grid of pixels on an array detector. The modeled detector has 4 megapixels (2000 by 2000 pixels), and dispersion was chosen to show all orders −2 to +2 and parts of orders +3 and −3 in the horizontal (x) direction.

Figure 8:
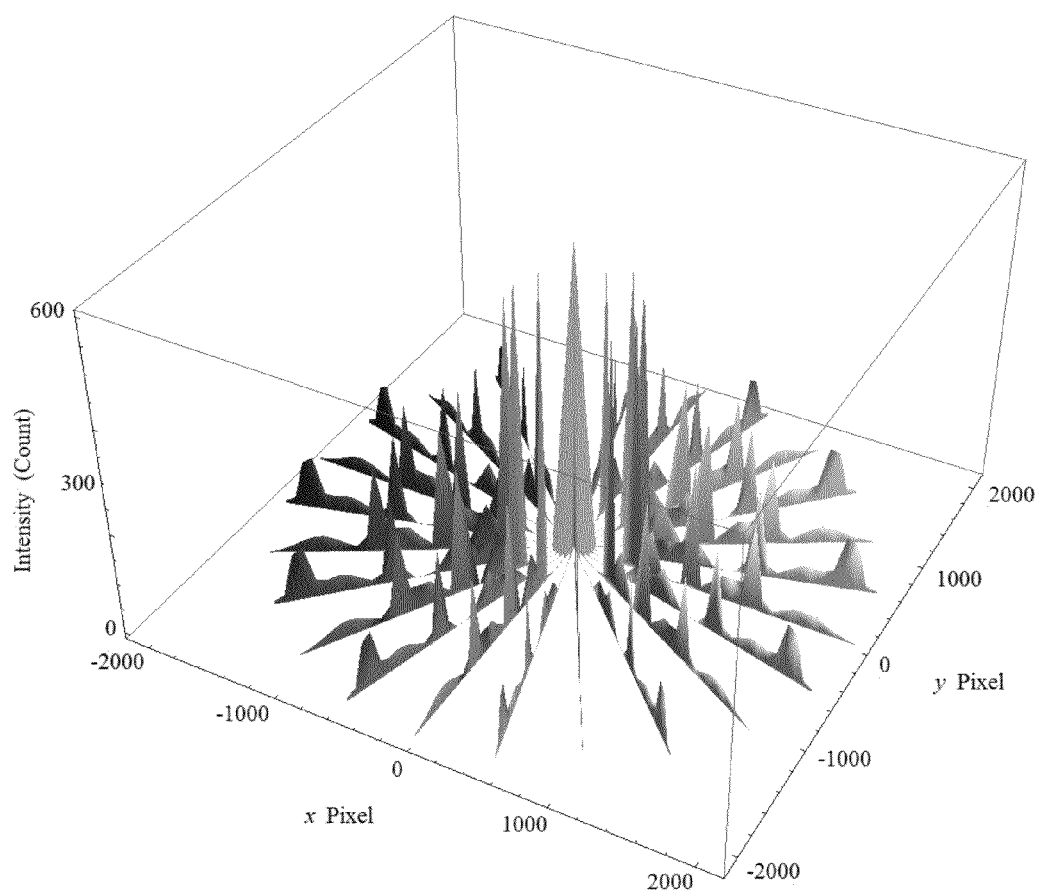
FIG. 8 provides an example of the relative throughput at various wavelengths obtained from a simulation of the throughput of multiple orders for a set of three stacked, double-dispersion diffraction gratings.

FIG. 8 provides an example of the relative throughput at various wavelengths obtained from a simulation of the throughput of multiple orders for a set of three stacked, double-dispersion diffraction gratings. Simulated spectra show intensity (vertical axis) as a function of position on an x-y grid of pixels on an array detector. The modeled detector has 4 megapixels (2000 by 2000 pixels), and dispersion was chosen to show all orders −2 to +2 and parts of orders +3 and −3 in the horizontal (x) direction. All the orders shown in FIG. 7, as well as some of the intermediate orders diffracted by both axes of the double-dispersion diffraction gratings, are shown. That is, cases where $n_x=n_y$ that were not included in FIG. 7 are included in FIG. 8. Additional orders where $n_x \ne n_y$, and neither $n_x$ nor $n_y=0$ are not shown.

Focusing Transmitted Light or EMR, Spectrum Image Formation & Detectors

After traversing the gratings, a lens or mirror can be used to collect diffracted light and focus the multiplicity of diffracted orders onto one or more array detectors, for example, a CMOS or CCD detector. For plane transmission gratings that produce spectra that are virtual images, appearing to float in space behind the grating, a lens or mirror can be used to form an image on a detector, which is then recorded electronically.

The lens can be placed with respect to the gratings so that the range of diffraction angles observable is approximately equal to the acceptance angle of the lens, i.e., positioned so its field of view matches the desired range of diffraction angles. Focus can be set so that the point spread function of the diffracted spectra has a minimum radius or, if the lens provides non-uniform imaging across the visible field, minimum point spread function radius over some portion of the observed field. Resolution is a function of focus/point spread function radius, as spatial blur corresponds to angular blur of the image. As known in the art, for diffraction gratings, the dispersion, $d\lambda/d\beta = d \cos \beta/m_{eff}$. Thus if a lens has a field of view across an angle $\theta$, and the detector has N pixels across the field of view, ignoring assorted image aberrations and distortions, the angular resolution $d\beta$ is approximately $\theta/N$ meaning the best resolution within a given order is approximately $d\lambda_{best} = d \cos \beta \, d\beta/m_{eff} = d \cos \beta \, \theta/N \, m_{eff}$. If the angular blur of the lens diffuses an image across p pixels, then the resolution, absent additional data processing, degrades to $d\lambda_{blurr} = d \, p \cos \beta \, \theta/N \, m_{eff}$. Algorithms that can improve the effective resolution of blurred spectra are well known to those skilled in the art of spectroscopy.

While a dispersed set of spectra can be easily discerned by a camera/detector combination focused at infinity, the virtual image of the spectrum is not at infinity. For a grating of width $\alpha$ and distance to the apparent source of L, Ives' equation (H.

E. Ives, "Note on the Location of the Spectrum Formed by a Plane Transmission Grating," J. Opt. Soc. Amer., 1, 172-176 (1917)) can be recast as follows, $$L' = L \frac{a\cos\left(\arcsin\left(\frac{\lambda}{d} + \left(\frac{\sin^2\beta + a^2 - 2a\sin\beta}{1 + a^2 - 2a\sin\beta}\right)^{1/2}\right)\right)}{\sin\left(\arcsin\left(\frac{\lambda}{d} + \left(\frac{\sin^2\beta + a^2 - 2a\sin\beta}{1 + a^2 - 2a\sin\beta}\right)^{1/2}\right) - \arcsin\left(\frac{\lambda}{d} - \sin\beta\right)\right)}$$

where
w grating width (mm)
L Light source—grating separation (mm)
L' Apparent distance from grating to virtual, dispersed source position
α w/2L
β Grating rotation angle.

So long as β is small, the source can appear to be at infinity due to the effects of the collimating off-axis parabola. At high angles, however, the source position shifts so that the camera lens cannot be set to infinity, but must be adjusted to optimize the focus. Resolution can be optimized by moving the entrance aperture closer to or farther from the collimating mirror to adjust beam divergence, in combination with optimum focusing of the focusing lens or mirror. If the "starburst" of spectra, as shown in FIGS. 4, 7, and 8, are not centered on the detector, software can be used to adjust the image. An off-center image can also provide greater intensity dynamic range than an on-axis image (while reducing precision under some levels of illumination due to the invisibility of some dispersion-degenerate spectra).

Figure 10:
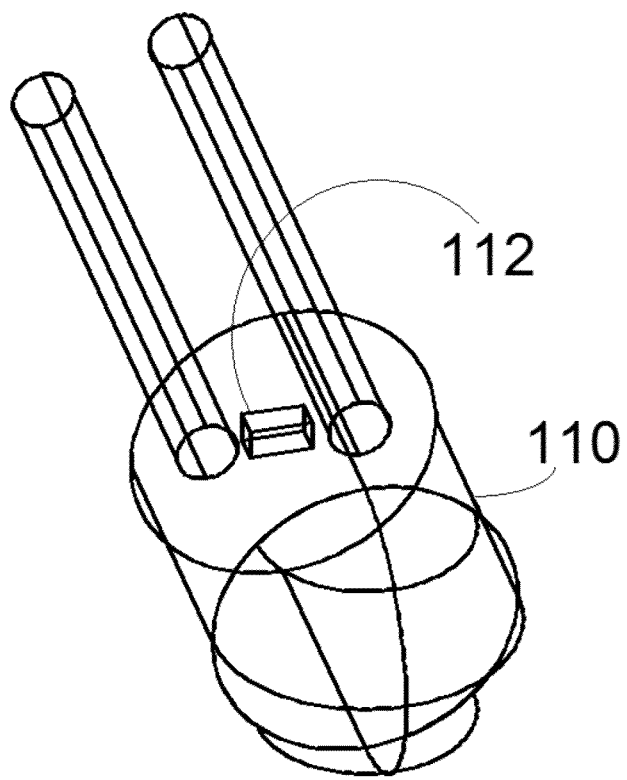
FIG. 10 is a perspective view of a temperature sensor positioned on an LED according to an embodiment of the present invention.

Software can be used to analyze the data presented by the multiple, generated spectra. For example, software can be used to calibrate the spectrograph using the known spectrum of the LED light source. Where the brightest wavelength of the LED is known, the location of the brightest spots of each family of orders gives ready access to places where a known $\lambda_{LED,brightest} = d \sin \beta m_{eff}/m_{eff}$. The peak wavelength of LEDs is known to be temperature-dependent, but the measurement of source temperature can be included in calibration algorithms. FIG. 10 shows a temperature sensor 112, such as a thermocouple or thermistor, positioned at a light source 110, shown here as an LED, for the purpose of measuring source temperature.

Array detectors typically used in spectrographs and related instruments can be used with an energy dispersion device or spectrograph of the invention. Charge-coupled detectors (CCD) can be employed for low-light-level detection such as that in atomic emission, fluorescence, phosphorescence, Raman and Brillouin scattering, as these array detectors have low read noise (1-10 electrons per pixel) allowing for detection of weak signals. Diode array detectors can be used for absorption measurements, as these detectors generally have a high full-well capacity (typically in excess of 100 million electrons e.g. up to 500 million electrons) that allow for precise measurement of small differences between large numbers of photons. The widely available, high-pixel-count consumer cameras fabricated with CMOS technology such as digital cameras and cell phone cameras, as well as the low-noise, high readout speed CMOS camera, also can be used with the energy dispersion device or spectrograph of the invention. Thus, in some embodiments, an energy dispersion device of the invention can be used with a cell phone camera or digital camera.

Applications

The energy dispersion device, spectrograph or method of the invention can be used to determine the quantitative and qualitative composition of matter using spectral information obtain from thermal emission, chemiluminescence, bioluminescence, triboluminescence, fluorescence, phosphorescence, absorption, specular and diffuse reflection, Raman scattering, Brillouin scattering, Rayleigh scattering, light-emission from semiconductors, and light amplification by stimulated emission of radiation The energy dispersion device, spectrograph or method of the invention can be used to characterize matter by measuring, for example, the elemental composition of a solid, liquid, or solution; the concentration of molecular or ionic solutes in solutions; or the concentrations of multiple molecular or ionic solutes in solutions. The energy dispersion device, spectrograph or method of the invention can be used to characterize matter by identifying molecules from their spectral characteristics and measuring the rates or mechanisms or reactions of molecules with each other through changes in their spectral characteristics in time or space. The energy dispersion device, spectrograph or method of the invention can be used to determine molecular species in solution or amorphous or crystalline solids.

The energy dispersion device or spectrograph can be used as a spectrophotometer or spectrofluorimeter when coupled with a wide-angle camera. The energy dispersion device or spectrograph of the invention can also be used for observation of molecules that are being separated if the separating device is in the form of a capillary column for liquid chromatography or capillary electrophoresis. The energy dispersion device or spectrograph of the invention can be used in place of any colorimetric measurement for a less subjective determination of pH or the presence of an analyte such as, for example, haemoglobin, nitrite, protein, glucose, urobilinogen and ketones. The energy dispersion device, spectrograph or method of the invention can also be used in conjunction with technologies involving nanoparticles or LED-pumped fluorescence resonant energy transfer. A device of the invention can be included in a kit that also contains other reactants (e.g. nanoparticles) or specifics for interpreting various tests (e.g. in the form of bar or QR codes).

The energy dispersion device of the invention can be incorporated within a stationary or roving camera or telescope. As such, the image focusing optics (lens or mirror) or the stationary or roving camera or telescope can be used to project the light to the limiting aperture of the energy dispersion device. The image focusing optics can include one or more scanning optics allowing the camera or telescope to obtain spectral information over a period of time or span of space or region.

Specific embodiments of the invention are described in the following examples, which do not limit the scope of the invention described in the claims.

EXAMPLE

A spectrophotometer was constructed using, as a light source, a white LED (RL-5-W5020), which produces a continuous spectrum from 420 to 720 nm, with peak emission from the blue, primary source LED near 450 nm (the LED is manufactured with an overcoat containing yttrium aluminum oxide phosphor which generated light over the remainder of the visible spectrum). The LED was powered by a lithium ion battery (CR2032). The LED back-illuminated a 50 micrometer diameter pinhole in a thin metallic disk, positioned one focal length from a 30° off-axis paraboloidal reflector (Edmund Scientific NT63-180). In addition, a plastic spectrophotometry cuvette and two-dimensional, holographic transmission gratings (Rainbow Symphony Store #01602 gratings with parallel lines 500 per mm) were used. In the experiment, three of these double-dispersion diffraction gratings (gratings in which the patterning is two-dimensional so that dispersion is in both vertical and horizontal directions) were stacked and rotated 30° about their normals. The first grating was placed some distance from the LED/cuvette combination so as to receive nearly collimated light (if light is collimated, the light forms a beam, so throughput is independent of the distance from the cuvette to the grating). The crossed gratings were placed at the plane of the CMOS camera's main lens (as close as possible to the lens). The spectra generated were obtained using a three megapixel OmniGraphics CMOS camera and controller (OV3642-ECJA-BAOA) using its auto-exposure control.

Since the three co-axial, 30°-rotated, double-dispersion diffraction gratings gave rise to dispersion in the vertical and horizontal directions, instead of a single value for n, one has $n_x$ and $n_y$, the order numbers in x and y directions (taking z as the direction of collimated light propagation). In addition to the expected orders, intermediate orders were also obtained. For example, at 45° between the x and y axes, $n_x=1$, $n_y=1$ for an effective order of $$\sqrt{n_x^2+n_y^2}=\sqrt{2},$$

Analysis of the spectral data showed that stacking several diffraction gratings, rotated about their normals, overcame the problem of low areal coverage and limited dynamic range for CMOS cameras. The spectrum in FIG. 4 showed a large number of orders filling a large portion of the array. In the range of dispersions observed, low orders (as is expected) have low linear dispersion, while higher orders have higher dispersion, as well as lower throughput. Thus, one has a trade-off. For measuring high concentrations (fluorescence) or reference intensity (spectrophotometry), the signal averages of dozens of orders at high resolution can be used to gain precision. For low concentrations (fluorescence) or absorbance of concentrated solutions, higher-throughput, lower dispersion spectra can be used. Thus, the dynamic range of the spectra is not limited by just the grating throughput or just the camera dynamic range—it is a product of the two dynamic ranges. Further, the large number of orders reflected many instances of the 450 nm LED peak. Therefore, one can determine centering and orders without knowing, in advance, where the image may lie.

The diffraction gratings, having been illuminated in collimated light, originated interfering waves from the entire illuminated area. Because common cuvettes are 10 mm wide, only a 9 mm diameter region of the gratings was illuminated. A wide-angle lens, placed 8 mm from the grating, allowed for observing diffraction angles up to $\tan^{-1}(4.5/8)=29°$. Since the acceptance angle of the camera lens was 24°, the field of view of the camera matched the range of diffraction angles. While the source of light did not appear at infinity, it did appear sufficiently distant that a far field, wide-angle lens (which is common in many consumer devices) was sufficient to generate the observed image. For a 3 megapixel image, the useful illuminated area is a share of approximately 1500 pixels on a side. Each pixel sees a range of approximately 2.3 minutes of arc, blurred by optical aberrations and, potentially, Fraunhofer diffraction. Bigger array detectors would be optimally used with even shorter focal length, wider angle lenses. The reduction in intensity for higher orders is due to several causes, including, at least, the changes in dispersion with order (intensity falls as the reciprocal of the effective order number), differences in diffraction efficiency with angle β, and optical vignetting.

Other Embodiments of the Invention

While the invention has been described in conjunction with the detailed description, the foregoing description is intended to illustrate and not limit the scope of the invention, which is defined by the scope of the appended claims. Other aspects, advantages, and modifications are within the scope of the following claims. Thus the specific methods and devices described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and are not restricted to the orders of steps indicated herein or in the claims.

As used herein and in the claims, the singular forms "a," "an," and "the" include the plural unless the context clearly dictates otherwise.

The terms and expressions that have been employed are used as terms of description and not of limitation, and there is no intent in the use of such terms and expressions to exclude any equivalent of the features shown and described or portions thereof. Various modifications are possible within the scope of the invention as claimed. Thus, although the present invention has been specifically disclosed by preferred embodiments and optional features, modification and variation of the concepts herein disclosed may be resorted to by those skilled in the art, and such modifications and variations are considered to be within the scope of this invention as defined by the claims. In addition, the invention has been described broadly and generically herein. Each of the narrower species and subgeneric groupings falling within the generic disclosure also form part of the invention.

What is claimed is:

1. An energy dispersion device, comprising:
   a limiting aperture;
   a collimating optic; and
   a wavelength dispersion component, wherein:
   said limiting aperture is positioned at the optical focus point of said collimating optic;
   said limiting aperture admits electromagnetic radiation incident on said collimating optic;
   said collimation optic collimates said electromagnetic radiation to be incident on said wavelength dispersion component;
   said wavelength dispersion component comprises a stack comprising two or more diffraction gratings;
   wherein each diffraction grating in said stack is selected from the group consisting of single-dispersion diffraction gratings and double-dispersion diffraction gratings;
   wherein each diffraction grating in said stack is about coplanar with each other diffraction grating in said stack; and
   wherein each diffraction grating in said stack is rotated about its normal such that it is rotated relative to each other diffraction grating in said stack; and
   said wavelength dispersion component diffracts said electromagnetic radiation into a multiplicity of diffraction orders.

2. The energy dispersion device of claim 1, wherein, for each diffraction grating in said stack, among its angles of rotation relative to each other diffraction grating in said stack, there is a smallest angle of rotation; wherein said smallest angle of rotation is approximately equal for all diffraction gratings in said stack; and wherein said smallest angle of rotation is between about 15° and about 90°, inclusive.

3. The energy dispersion device of claim 2, wherein said smallest angle of rotation is about 15°, 20°, 22.5°, 30°, 45°, 60°, 75° or 90°.

4. The energy dispersion device of claim 1, wherein said stack comprises three single-dispersion diffraction gratings, each diffraction grating in said stack being rotated about 60° relative to another diffraction grating in said stack.

5. The energy dispersion device of claim 1, wherein said stack comprises four single-dispersion diffraction gratings, each diffraction grating in said stack being rotated about 45° relative to another diffraction grating in said stack.

6. The energy dispersion device of claim 1, wherein said stack comprises five single-dispersion diffraction gratings, each diffraction grating in said stack being rotated about 36° relative to another diffraction grating in said stack.

7. The energy dispersion device of claim 1, wherein said stack comprises six single-dispersion diffraction gratings, each diffraction grating in said stack being rotated about 30° relative to another diffraction grating in said stack.

8. The energy dispersion device of claim 1, wherein said stack comprises one double-dispersion diffraction grating and four single-dispersion diffraction gratings, each single-dispersion diffraction grating in said stack being rotated about +30° or −30° relative to another diffraction grating in said stack.

9. The energy dispersion device of claim 1, wherein said stack comprises a double-dispersion diffraction grating, a first single-dispersion diffraction grating, and a second single-dispersion diffraction grating, wherein said first single-dispersion diffraction grating is rotated about +45° relative to said double-dispersion diffraction grating and said second single-dispersion diffraction grating is rotated about −45° relative to said double-dispersion diffraction grating.

10. The energy dispersion device of claim 1, wherein said stack comprises two double-dispersion diffraction gratings and two single-dispersion diffraction gratings, each diffraction grating in said stack being rotated about 30° relative to another diffraction grating in said stack.

11. The energy dispersion device of claim 1, wherein said stack comprises two double-dispersion diffraction gratings rotated about 45° relative to each other.

12. The energy dispersion device of claim 1, wherein said multiplicity of diffraction orders is between 2 and 10, inclusive.

13. The energy dispersion device of claim 1, wherein said multiplicity of diffraction orders is 2, 3, 4, 5, 6 or 8.

14. The energy dispersion device of claim 1, wherein said diffraction gratings have about the same separation and pitch, and wherein said electromagnetic radiation is dispersed with cylindrical symmetry about an observational center or origin.

15. The energy dispersion device of claim 1, further comprising an electromagnetic radiation source, wherein the electromagnetic radiation emitted by said electromagnetic radiation source is admitted through said limiting aperture to the collimating optic.

16. The energy dispersion device of claim 15, wherein said electromagnetic radiation source is a light-emitting diode.

17. The energy dispersion device of claim 16, further comprising a temperature sensor positioned at or near the light-emitting diode pn junction.

18. The energy dispersion device of claim 17, wherein said temperature sensor is a thermocouple or thermistor.

19. The energy dispersion device of claim 15, wherein said electromagnetic radiation source emits or is capable of emitting fluorescent light.

20. The energy dispersion device of claim 15, wherein said electromagnetic radiation source is autofluorescent.

21. The energy dispersion device of claim 15, wherein said electromagnetic radiation source emits or is capable of emitting phosphorescent light.

22. A spectrograph comprising the energy dispersion device of claim 15, one or more focusing lens or mirrors, and one or more rectangular array detectors.

23. The spectrograph of claim 22, wherein said one or more focusing lens or mirrors and said one or more rectangular array detectors have fields of view effective to observe at least two diffraction orders simultaneously.

24. The spectrograph of claim 22, wherein said one or more focusing lens or mirrors and said one or more rectangular array detectors have fields of view effective to observe at least three diffraction orders simultaneously.

25. The spectrograph of claim 22, wherein said one or more detectors are complementary metal-oxide-semiconductor devices, charged-coupled devices, or charged injection devices.

26. The energy dispersion device of claim 1, wherein said collimating optic is an off-axis parabolic mirror or replica parabola.

27. The energy dispersion device of claim 1, wherein said collimating optic is an achromatic or superachromatic lens.

28. The energy dispersion device of claim 1, further comprising a sample holder capable of receiving a fluid or a solid sample, wherein said fluid or solid sample, if in said sample holder, is interposed in the collimated light between said collimating optic and said diffraction gratings.

29. The energy dispersion device of claim 28, wherein said stack is bonded to said sample holder.

30. The energy dispersion device of claim 29, wherein said stack is glued to a face of said sample holder, printed onto a face of said sample holder, or embossed onto a face of said sample holder.

31. A method for determining absorption by a sample, comprising:
placing said sample into the sample holder of claim 28;
illuminating said sample with collimated light; and
determining the amount of light absorbed by said sample by comparing the diffraction spectra obtained in the presence of the sample with the spectra obtained in the absence of the sample.

32. A single-beam spectrophotometer comprising the energy dispersion device of claim 1.

33. A fluorimeter or phosphorimeter comprising the energy dispersion device of claim 1.

34. A spectrograph comprising the energy dispersion device of claim 1, one or more focusing lens or mirrors, and one or more rectangular array detectors.

35. The spectrograph of claim 34, wherein said one or more focusing lens or mirrors and said one or more rectangular array detectors have fields of view effective to observe at least two diffraction orders simultaneously.

36. The spectrograph of claim 34, wherein said one or more focusing lens or mirrors and said one or more rectangular array detectors have fields of view effective to observe at least three diffraction orders simultaneously.

37. The spectrograph of claim 34, wherein said one or more detectors are complementary metal-oxide-semiconductor devices, charged-coupled devices, or charged injection devices.

38. A spectrally-resolving camera, comprising:
the energy dispersion device of claim 1; and
an image focusing optic effective to project the electromagnetic radiation spectrum corresponding to an image impinging on said limiting aperture of said energy dispersion device, such that said electromagnetic radiation spectrum is dispersed by said energy dispersion device and recorded by the camera.

39. A spectrally-resolving camera of claim 38, wherein said spectrally-resolving camera is attached to a moveable element in a manner effective for said image focusing optic to project a sequence of images to said limiting aperture of said energy dispersion device sequentially, randomly, or in a specified sequence in time.

40. The spectrally-resolving camera of claim 38, wherein said image focusing optic comprises one or more mirrors, lens, or a combination thereof capable of scanning various points in a scene and projecting light from said various points to said limiting aperture of said energy dispersion device.

41. The spectrally-resolving camera of claim 38, wherein said image focusing optic comprises a Digital Light Processor.

42. A method for measuring fluorescence comprising determining the diffraction spectra of the fluorescent sample relative to a similar, non-fluorescent sample using the energy dispersion device of claim 1.

43. A method for measuring phosphorescence comprising determining the diffraction spectra of a phosphorescent sample relative to a similar, non-phosphorescent sample using the energy dispersion device of claim 1.

* * * * *